United States Patent
Sivaraj et al.

(10) Patent No.: US 11,558,276 B2
(45) Date of Patent: *Jan. 17, 2023

(54) LATENCY PREDICTION AND GUIDANCE IN WIRELESS COMMUNICATION SYSTEMS

(71) Applicant: AT&T Intellectual Property I, L.P., Atlanta, GA (US)

(72) Inventors: Rajarajan Sivaraj, Dublin, CA (US); Varun Gupta, Morristown, NJ (US); Dhruv Gupta, San Ramon, CA (US); Rittwik Jana, Montville, NJ (US); Jin Wang, Fremont, CA (US); Laurie Bigler, Lafayette, CA (US); Weihua Ye, Chicago, IL (US); Zhengye Liu, Pleasanton, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 70 days.

This patent is subject to a terminal disclaimer.

(21) Appl. No.: 17/314,552

(22) Filed: May 7, 2021

(65) Prior Publication Data
US 2021/0266247 A1 Aug. 26, 2021

Related U.S. Application Data

(63) Continuation of application No. 16/220,664, filed on Dec. 14, 2018, now Pat. No. 11,044,185.

(51) Int. Cl.
*H04L 43/0876* (2022.01)
*H04L 43/0852* (2022.01)
(Continued)

(52) U.S. Cl.
CPC ........ *H04L 43/0876* (2013.01); *G06N 20/00* (2019.01); *H04L 5/006* (2013.01); *H04L 41/145* (2013.01); *H04L 43/0852* (2013.01)

(58) Field of Classification Search
CPC ... H04L 43/0876; H04L 5/006; H04L 41/145; H04L 43/0852; G06N 20/00
See application file for complete search history.

(56) References Cited

U.S. PATENT DOCUMENTS 7,773,991 B2 8/2010 Osterling et al.
8,059,557 B1 11/2011 Sigg et al.
(Continued)

FOREIGN PATENT DOCUMENTS

AU 2013288859 B2 5/2016
CA 2611653 A1 5/2008
(Continued)

OTHER PUBLICATIONS

Liu, et al., "VR Video Transmission With Layered Video by Re-Using Existing Network Infrastructures," U.S. Appl. No. 16/167,792, filed Oct. 23, 2018, 35 pages.
(Continued)

*Primary Examiner* — Chae S Lee
(74) *Attorney, Agent, or Firm* — Amin, Turocy & Watson, LLP

(57) ABSTRACT

The described technology is generally directed towards reducing latency in a wireless communications network. Radio access network latency data corresponding to a measured latency impact criterion is obtained by a network device of a wireless network. Based on the radio access network latency data, latency guidance data usable by the radio network device to achieve a reduction in communication latency that is experienced by a user equipment is predicted, e.g., by a learned model. The latency guidance data can be used to facilitate a reduction in the communication latency that is experienced by a user equipment.

20 Claims, 22 Drawing Sheets

(51) Int. Cl.
   H04L 41/14 (2022.01)
   G06N 20/00 (2019.01)
   H04L 5/00 (2006.01)

(56) References Cited

U.S. PATENT DOCUMENTS

| | | | |
|---|---|---|---|
| 8,918,535 | B2 | 12/2014 | Xu et al. |
| 8,930,562 | B2 | 1/2015 | Chen et al. |
| 8,971,245 | B2 | 3/2015 | Haynes et al. |
| 9,043,467 | B2 | 5/2015 | Kovvali et al. |
| 9,246,842 | B2 | 1/2016 | Man et al. |
| 9,257,092 | B2 | 2/2016 | Bidarkar et al. |
| 9,332,050 | B2 | 5/2016 | Collard et al. |
| 9,369,513 | B2 | 6/2016 | Zhao et al. |
| 9,402,114 | B2 | 7/2016 | Gahm et al. |
| 9,503,379 | B2 | 11/2016 | Yang et al. |
| 9,614,766 | B2 | 4/2017 | Zhao et al. |
| 2002/0154691 | A1 | 10/2002 | Kost et al. |
| 2012/0030723 | A1 | 2/2012 | Baum et al. |
| 2013/0266289 | A1 | 10/2013 | Oyman et al. |
| 2013/0329777 | A1 | 12/2013 | Konda et al. |
| 2014/0095670 | A1 | 4/2014 | Ozgur et al. |
| 2014/0219088 | A1 | 8/2014 | Oyman et al. |
| 2014/0241421 | A1 | 8/2014 | Orton-Jay |
| 2014/0258456 | A1 | 9/2014 | Lee et al. |
| 2015/0124622 | A1 | 5/2015 | Kovvali et al. |
| 2016/0088054 | A1 | 3/2016 | Hassan et al. |
| 2016/0192296 | A1 | 6/2016 | Rehan et al. |
| 2016/0234078 | A1 | 8/2016 | Jana et al. |
| 2016/0269929 | A1 | 9/2016 | Livanos et al. |
| 2017/0034006 | A1 | 2/2017 | Rajapakse |
| 2017/0149624 | A1 | 5/2017 | Chitti et al. |
| 2017/0150311 | A1 | 5/2017 | Krinsky et al. |
| 2018/0007121 | A1 | 1/2018 | Krishnan et al. |
| 2018/0184101 | A1 | 6/2018 | Ho |
| 2018/0288773 | A1 | 10/2018 | Liu et al. |
| 2019/0238465 | A1 | 8/2019 | Das et al. |
| 2019/0364492 | A1 | 11/2019 | Azizi et al. |
| 2020/0322696 | A1* | 10/2020 | Dvir ................... H04N 21/2402 |
| 2022/0248194 | A1* | 8/2022 | Yu ........................ G05D 1/0276 |

FOREIGN PATENT DOCUMENTS

| | | |
|---|---|---|
| CA | 2673661 A1 | 7/2008 |
| CA | 2941701 A1 | 9/2015 |
| WO | 2011/047335 A1 | 4/2011 |
| WO | 2014/001246 A1 | 1/2014 |
| WO | 2014/160553 A1 | 10/2014 |
| WO | 2014/177293 A1 | 11/2014 |
| WO | 2014/209494 A1 | 12/2014 |
| WO | 2016/118166 A1 | 7/2016 |

OTHER PUBLICATIONS

Bao, et al., "Shooting a Moving Target Motion-Prediction-Based Transmission for 360-Degree Videos," Last Accessed: Feb. 15, 2019, 10 pages.
microsoft.com, "QProbe: Locating the Bottleneck in Cellular Communication—Microsoft Research," Last Accessed: Feb. 15, 2019, 1 page.
Chen, et al., "QoE Doctor: Diagnosing Mobile App QoE with Automated UI Control and Cross-layer Analysis," IMC'14, Nov. 5-7, 2014, Vancouver, BC, Canada. Copyright 2014, 14 pages.
mirmproxy.org, "an interactive HTTPS proxy," Last Accessed: Feb. 15, 2019, 5 pages.
Elbamby, et al., "Toward Low-Latency and Ultra-Reliable Virtual Reality," © 2018 IEEE, 7 pages.
ETSI, "Mobile Edge Computing (MEC); Radio Network Information API," © ETSI 2017, 5 pages.
facebook.com, "Extreme—360°, Angel Falls, Venezuela Aerial 4K video," Last Accessed: Feb. 15, 2019, 1 page.
facebook.com, "Amazing Gaming—Snow Forest Roller Coaster 360 VR 4K," Last Accessed: Feb. 15, 2019, 1 page.
initeslab.pol y.edu, "TCP congestion control basics," Last Accessed: Feb. 15, 2019, 12 pages.
Liu, et al., "360° Innovations for Panoramic Video Streaming," © 2017 Association for Computing Machinery, 7 pages.
Holfeld, et al., "Wireless Communication for Factory Automation: An Opportunity for L TE and 5G Systems" IEEE Communications Magazine• Jun. 2016, 8 pages.
Hosseini, et al., "Adaptive 360 VR Video Streaming: Divide and Conquer!," arXiv:1609.08729v5 [cs.MM] Nov. 17, 2017, 6 pages.
iperf.fr, "iPerf3 and original iPerf pre-compiled binaries," Last Accessed: Feb. 15, 2019, 7 pages.
charlesproxy.com, "Web Debugging Proxy Application for Windows, Mac OS and Linux," Last Accessed Feb. 15, 2019, 2 pages.
Huang, et al., "A Close Examination of Performance and Power Characteristics of 4G L TE Networks," MobiSys'12, Jun. 25-29, 2012, Low Wood Bay, Lake District, UK. Copyright 2012, 14 pages.
ITU, "IMT Vision—Framework and overall objectives of the future development of IMT for 2020 and beyond," ITU 2015, 21 pages.
itu.int, "Tactile Internet," Last Accessed: Feb. 15, 2019, 2 pages.
code.fb.com, "Next-generation video encoding techniques for 360 video and VR," Last Accessed: Feb. 15, 2019, 2 pages.
developer.oculus.com, "The Latent Power of Prediction," Last Accessed: 2115/19, 7 pages.
Lin, "A Concordance Correlation Coefficient to Evaluate Reproducibility," Biometrics, vol. 45, No. 1 (Mar. 1989), pp. 255-268.
Li et al., "Mobilelnsight: Extracting and Analyzing Cellular Network Information on Smartphones," MobiCom'16, Oct. 3-7, 2016, New York City, N/y, USA, 14 pages.
Li, et al., "A Control-Plane Perspective on Reducing Data Access Latency in L TE Networks," MobiCom '17, Oct. 16-20, 2017, Snowbird, UT, USA © 2017, 14 pages.
Liu, et al., "360° Innovations for Panoramic Video Streaming," HotNets—XVI, Nov. 30-Dec. 1, 2017, Palo Alto, CA, USA © 2017 Association for Computing Machinery, 7 pages.
Mangla, et al., Video Through a Crystal Ball: Effect of Bandwidth Prediction Quality on Adaptive Streaming in Mobile Environments, Last Accessed: Feb. 15, 2019, 6 pages.
Nikravesh, et al., "Mobile Network Performance from User Devices: A Longitudinal, Multidimensional Analysis," Last Accessed: Feb. 15, 2019, 10 pages.
s3amazonaws.com, "Static Oculus," Last Accessed: Feb. 15, 2019, 1 page.
Qian, et al., "Optimizing 360 Video Delivery Over Cellular Networks," AllThingsCellular'16, Oct. 3-7, 2016, New York City, NY, USA, 6 pages.
Reshef, et al., "Detecting Novel Associations in Large Data Sets," Dec. 16, 2011 vol. 334, 8 pages.
Simsek, et aL, "5G-Enabled Tactile Internet," (c) 2015 IEEE, 15 pages.
Wan, et aL, "Supporting Mobile VR in LTE Networks: How Close AreWe?," © 2018 Association for Computing Machinery, 31 pages.
Winstein, et al., "Stochastic Forecasts Achieve High Throughput and Low Delay over Cellular Networks," 10th USENIX Symposium on Networked Systems Design and Implementation (NSDI '13), 13 pages.
Rambo, "Fixed Wireless Broadband Expected to Grow 30% in 2018," Apr. 25, 2018, 4 pages.
saguna.net, "How Mobile Edge Computing (MEC) Achieves 5G Goals," Last Accessed: Feb. 15, 2019, 4 pages.
Xie, "POI360: Panoramic Mobile Video Telephony over L TE Cellular Networks," CoNEXT '17, Incheon, Republic of Korea © 2017 ACM, 14 pages.
Xie, et al., "piStream: Physical Layer Informed Adaptive Video Streaming Over L TE," MobiCom'15, Sep. 7-11, 2015, Paris, France, 13 pages.
Xie, et al., "Accelerating Mobile Web Loading Using Cellular Link Information," MobiSys '17, Jun. 19-23, 2017, Niagara Falls, NY, USA, 13 pages.
Yilmaz, et al., "Analysis of Ultra-Reliable and Low-Latency 5G Communication for a Factory Automation Use Case," 2015 IEEE, 6 pages.
Molino, "Demand for Augmented and Virtual Reality Expected to Soar This Year," May 31, 2018, 5 pages.

(56) References Cited

OTHER PUBLICATIONS

Birke, Robert et al., "Architecture of a networkaware P2PTV Application: the NAPAWINE approach", IEEE Communications Magazine 49.6, 2011, 154-163.

Borcoci, Eugen, "Content Distribution in Wireless/5G Environments", University POLITEHNICA Bucharest (UPB), Oct. 12, 2015, 1-87.

Fajardo, Jose O. et al., "Introducing mobile edge computing Capabilities through distributed 5G cloud enabled small cells", Mobile networks and applications 21.4, 2016, 564-574.

Jiang, Junchen et al., "Improving fairness, efficiency, and stability in httpbased adaptive video streaming with festive", Proceedings of the 8th International conference on Emerging networking experiments and Technologies. ACM, 2012, 97-108.

Maier, Martin et al., "The tactile internet: vision, recent progress, and open challenges", IEEE Communications Magazine 54.5, 2016, 138-145.

Maza, William David Diego, "A Framework for Generating HTTP Adaptive Streaming Traffic in ns3", SIMU Tools—9th EAI International Conference on Simulation Tools and Techniques, 2016, 1-7.

Office Action for U.S. Appl. No. 15/475,682 dated Oct. 29, 2018, 44 pages.

Non-Final Office Action received for U.S. Appl. No. 16/220,664 dated Mar. 20, 2020, 45 pages.

Final Office Action received for U.S. Appl. No. 16/220,664 dated Oct. 5, 2020, 31 pages.

\* cited by examiner

LATENCY PREDICTION AND GUIDANCE IN WIRELESS COMMUNICATION SYSTEMS

RELATED APPLICATION

The subject patent application is a continuation of, and claims priority to, U.S. patent application Ser. No. 16/220,664, filed Dec. 14, 2018, and entitled "LATENCY PREDICTION AND GUIDANCE IN WIRELESS COMMUNICATION SYSTEMS," the entirety of which application is hereby incorporated by reference herein.

TECHNICAL FIELD

The subject application is related to wireless communication systems, and, for example, to predicting latency in a wireless communication system and using the resulting latency prediction information as a guide to reduce latency experienced in the wireless communication system.

BACKGROUND

New Radio, (NR, sometimes referred to as 5G) promises massive data transfer speeds and extremely low latencies. These characteristics are expected to be leveraged by services such as augmented reality/virtual reality, immersive gaming, and tactile internet, which have high bandwidth requirements of hundreds of Mbps and extremely low latency requirements of a few milliseconds. Among planned 5G use-case scenarios, ultra-reliable low latency communication (URLLC) use-cases are expected to impose the most stringent requirements on network operators.

However, 5G deployments are expected to ramp up slowly, and 4G LTE networks are expected to co-exist with 5G for the foreseeable future. As a result, 4G/LTE cellular networks are expected to provide the bulk of wireless radio coverage for a while. Thus, wireless service providers (mobile operators) need to be able to support latency-sensitive applications on existing 4G networks as well as 5G networks.

BRIEF DESCRIPTION OF THE DRAWINGS

The technology described herein is illustrated by way of example and not limited in the accompanying figures in which like reference numerals indicate similar elements and in which.

DETAILED DESCRIPTION

Briefly, one or more aspects of the technology described herein are generally directed towards using a radio access network (RAN) latency prediction model to reduce latency in a wireless network. As will be understood, aspects comprise building, and then using, a prediction model for downlink RAN latency based on one or more criteria that impacts latency. Such criteria can include, but is not limited to, spectrum utilization (background load, buffer fullness condition related to traffic), channel/signal quality (e.g., radio signal received power), cell/base station load (active user equipment radio resource control connections on the cell, and traffic-related data, (e.g., traffic rate based on application data payload size and inter-packet arrival time).

In real-time operation, current latency impact criteria in a wireless network are measured, and input into the prediction model. The input results in latency guidance information that is output and can be used to reduce latency, e.g., latency being experienced by a user equipment.

Thus, described is a technology such as implemented as a platform that can use real-time data from a mobile network to drive online prediction of RAN latency, and identify the key network factors impacting the latency. Such a latency-guidance prediction can provide low-latency content delivery applications with a feedback loop from the network to improve the applications' content delivery, and a mobile operator can deploy Self-Organized Network (SoN) type applications to utilize the latency guidance for network optimization aimed at improving end user quality of experience.

It should be understood that any of the examples and terms used herein are non-limiting. For instance, while benefits and advantages are achieved in 4G LTE networks, the technology can be used in New Radio (NR/5G) networks. As another example, the technology is not limited to any particular type of user equipment, but rather any wireless-capable user equipment may benefit from the technology described herein, including smartphones, machine type communication devices, wearables, sensors, tablets, notebooks, modems (cards, dongles/adapters (e.g., USB)) and so on. Thus, any of the examples herein are non-limiting examples, and any of the embodiments, aspects, concepts, structures, functionalities or examples described herein are non-limiting, and the technology may be used in various ways that provide benefits and advantages in wireless radio communications in general.

Figure 1:
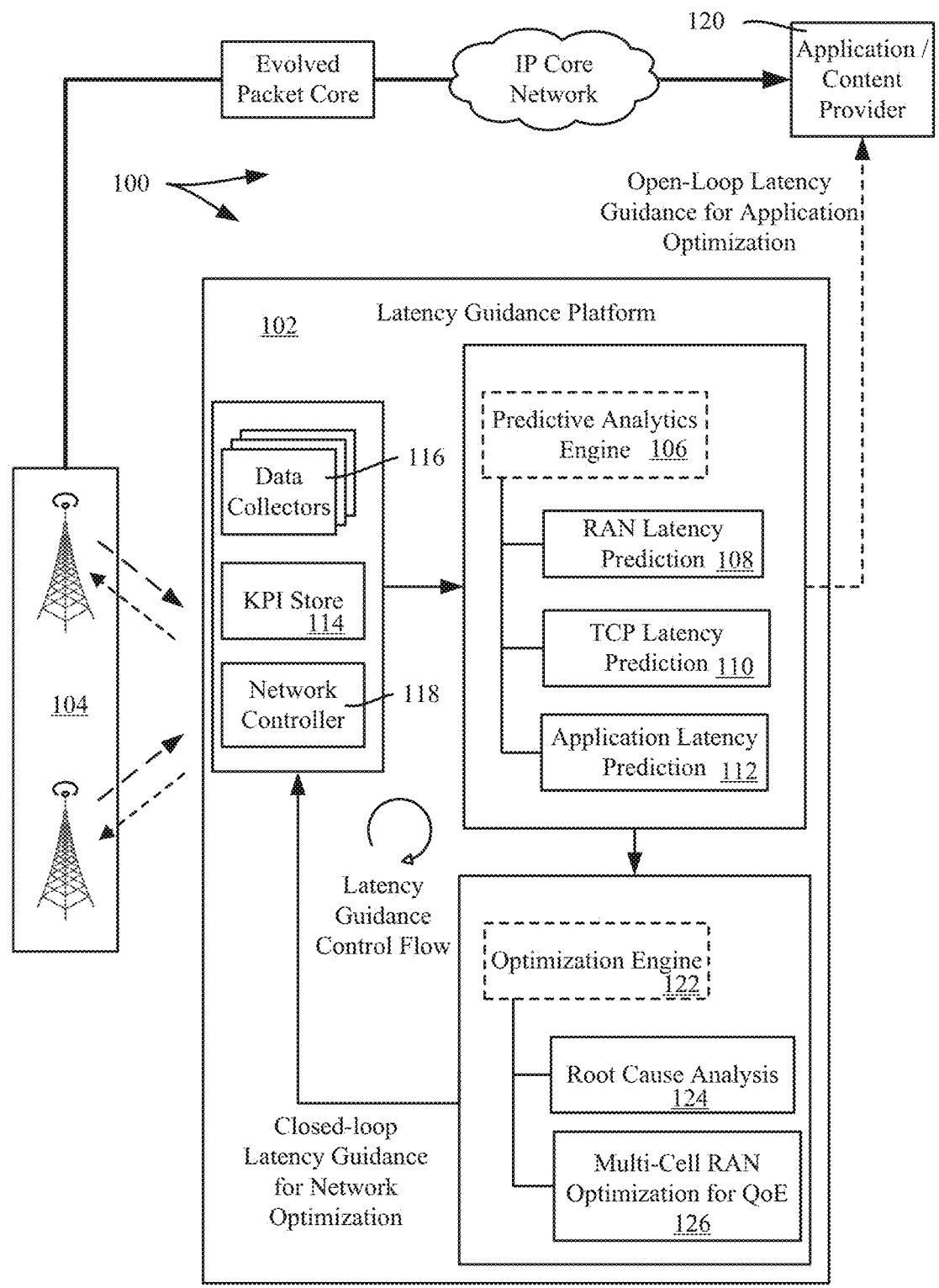
FIG. 1 illustrates an example wireless communication system comprising an online latency guidance system for reducing radio access network (RAN) latency, in accordance with various aspects and implementations of the subject disclosure.

FIG. 1 illustrates an example wireless communication system 100 in accordance with various aspects and embodiments of the subject technology, including a latency guidance platform 102. In general, the cell sites/radio network device base stations 104 provide information for real time RAN trace collection, as represented by the dashed arrows from the cell sites/radio network device base stations to the latency guidance platform 102. As represented in FIG. 1, the latency guidance platform 102 comprises a predictive analytics engine 106 that provides RAN latency prediction 108, TCP RTT latency prediction 110 and application latency prediction 112.

Prediction is based, at least in part, on real-time RAN key performance indicators (KPIs, maintained in a store 114) received from the operator network RAN trace feed (e.g., by data collectors 116). Latency-related KPIs can include, but are not limited to user-specific initial scheduling delay, MAC (Medium Access Control) delay, and RLC (Radio Link Control) delay for the duration of the session. PDCP (Packet Data Convergence Protocol) layer KPIs refer to user-specific PDCP throughput and PDCP PDU (Protocol Data Unit) loss rate for the session duration. RLC layer KPIs reflect user-specific RLC PDU error rate percentage, triggered by RLC ARQ NACKs (automatic repeat request negative acknowledgements) and total number of RLC SDUs (service data units) for the duration of the session. MAC layer KPIs comprise user-specific MAC PDU error rate percentage (triggered by MAC HARQ NACKs), total number of MAC HARQ transmissions, total number of successful MAC HARQ transmissions modulated with QPSK, 4 QAM, 16 QAM and 64 QAM, and total size of MAC PDUs transmitted for the session. The physical (PHY) layer provides periodic logging of user-specific RSRP (reference signal received power) and RSRQ (reference signal received quality throughout the duration of the session. Cell-level KPIs correspond to periodic logging of the number of active user RRC (radio resource control) connections on the cell and the PRB (physical resource block) utilization of the cell.

In general, latency values are computed in real-time and the values are fed-back in closed-loop (e.g., to a network controller 118) or open-loop fashion, e.g., to an application/content provider 120. Open-loop feedback involves publishing latency guidance results, which are subscribed by latency-critical applications to improve performance and QoE (quality of experience).

For closed-loop operation, an optimization engine 122, e.g., comprising root cause analysis component 124 that evaluates the general cause of the latency and a multi-cell RAN optimization component 126 for QoE ( ) can help provide the guidance that will reduce latency. As described herein, closed-loop operations involve feeding guidance results back to the network and optimizing the network. Note that "optimization" and like terms (e.g., optimize, optimizing) as used herein are not intended to mean optimizing perfectly, but rather improving operations (e.g., reducing latency) in a more optimal direction.

Figure 2:
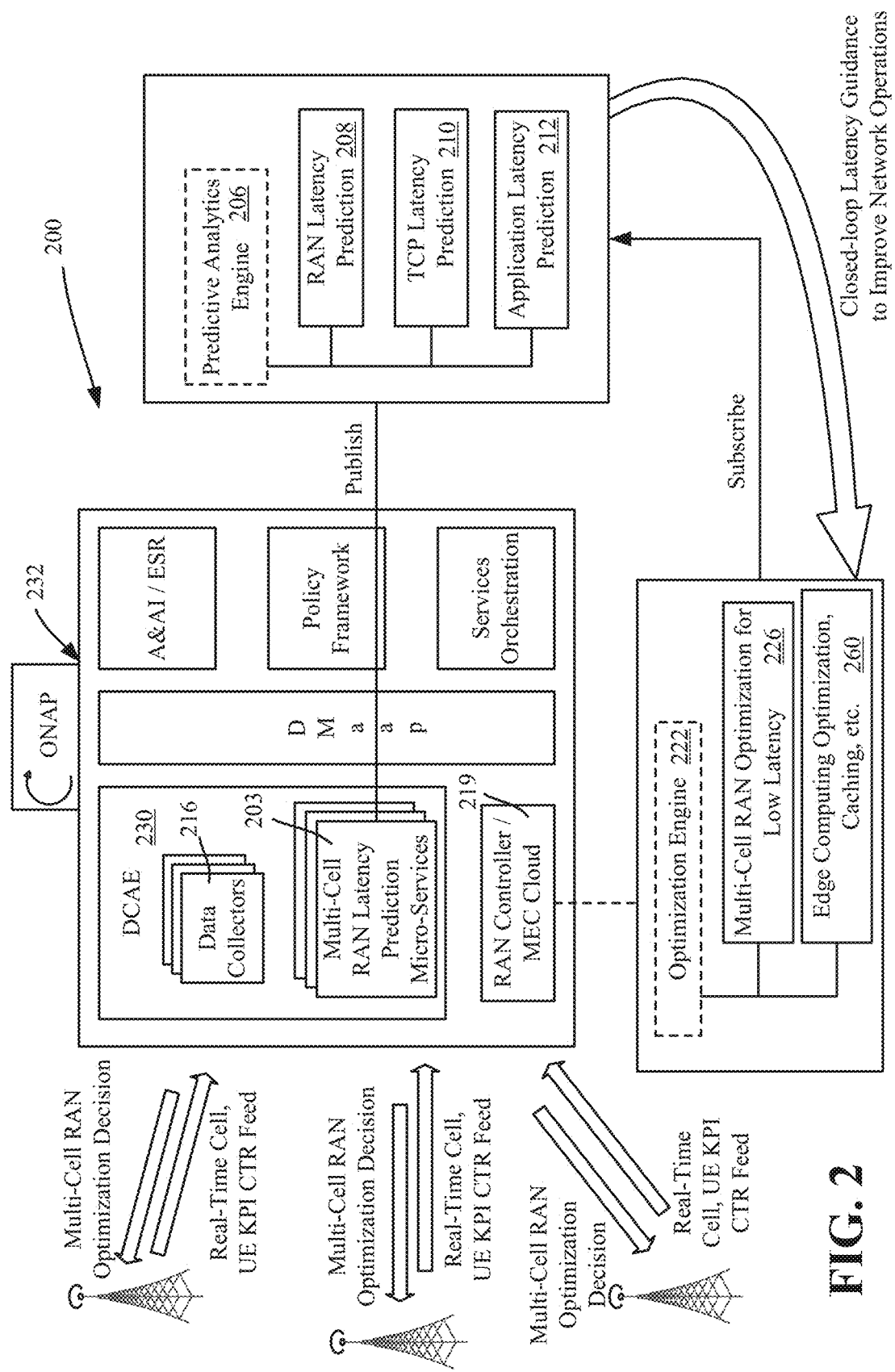
FIG. 2 illustrates an example wireless communication system comprising a latency guidance system for improving RAN operations and edge computations to reduce RAN latency, in accordance with various aspects and implementations of the subject disclosure.

FIG. 2 illustrates another scenario, of an example wireless communication system 200 in accordance with various aspects and embodiments of the subject technology. Note that in FIG. 2, any instances of components labeled 2xx are generally the same as their counterpart instances 1xx in FIG. 1, and are generally not described again for purposes of brevity.

In one or more implementations, the RAN latency guidance model can be integrated as a micro-services module 203 within the DCAE 230 (Data Collection, Analytics and Events) of the ONAP (Open Network Automation Platform) platform 232. Typically, the data collectors in the DCAE 230 receive the RAN key performance indicators (KPIs) from the real-time cell traffic recordings (CTR) feed generated from eNBs (evolved Node B or eNB) deployed in a production network. The micro-services module 203 running in DCAE 220 can publish real-time RAN- and cross-layer latency prediction results using the models described herein.

For example, a server can publish latency guidance based on the RAN latency prediction model to subscriber devices. The RAN controller or MEC server (block 219) within ONAP 232 can subscribe to the latency guidance module to optimize network operations. This can be regarded as a closed-loop use-case for latency guidance, where the prediction results are being fed back to the RAN systems, to improve operations. Alternatively, as describe with reference to FIG. 1, the latency guidance module can be used for open-loop use cases, as well, where the published results on real-time RAN- and cross-layer latency prediction can be used by third-party applications or content servers to improve their streaming operations.

FIG. 2 more particularly illustrates closed-loop multi-cell RAN optimization. This is one use-case that can be employed for evaluating the impact of the RAN latency models, such as in improving the performance of virtual reality. In FIG. 2, for example, the RAN latency prediction results are subscribed by the RAN controller (block 219), mainly to perform intelligent load-balancing or hand-off operations. That is, when one cell is predicted to experience higher RAN latency (based on the model), the controller can make decisions as to whether the controller can hand-off some of the users from the cell to another target cell that is predicted to have lower RAN latency. This can improve the QoE of UEs, especially those using latency-critical applications like VR.

The prediction results can also be subscribed by an MEC server (also represented in block 219) in DCAE 230 to make intelligent decisions on content caching, offloading computations etc. to reduce application latency.

Figure 3:
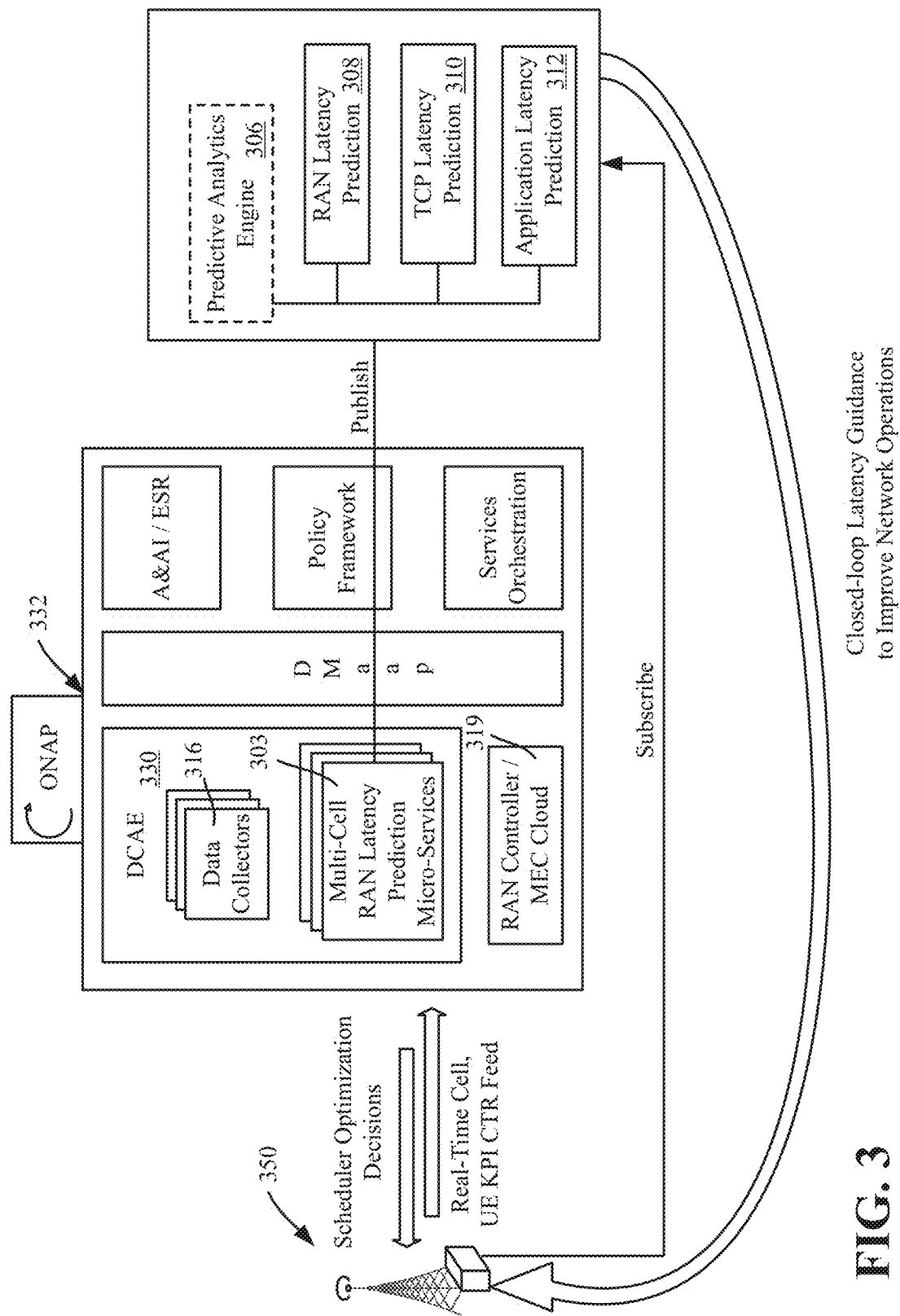
FIG. 3 illustrates an example wireless communication system comprising a latency guidance system for improving base station device scheduling decisions to reduce RAN latency, in accordance with various aspects and implementations of the subject disclosure.

FIG. 3 illustrates closed-loop scheduler optimization. To this end, the RAN latency prediction results are subscribed by the eNB 350 (e.g., directly) to be able to optimize its scheduler decisions. In addition, the eNB 350 can use these guidance results to decide scheduling data across different radio bearers and QoS class identifiers. This can further enable the eNB 350 (and also the RAN controller 319, discussed with reference to FIG. 2, to improve RAN slicing operations.

Figure 4:
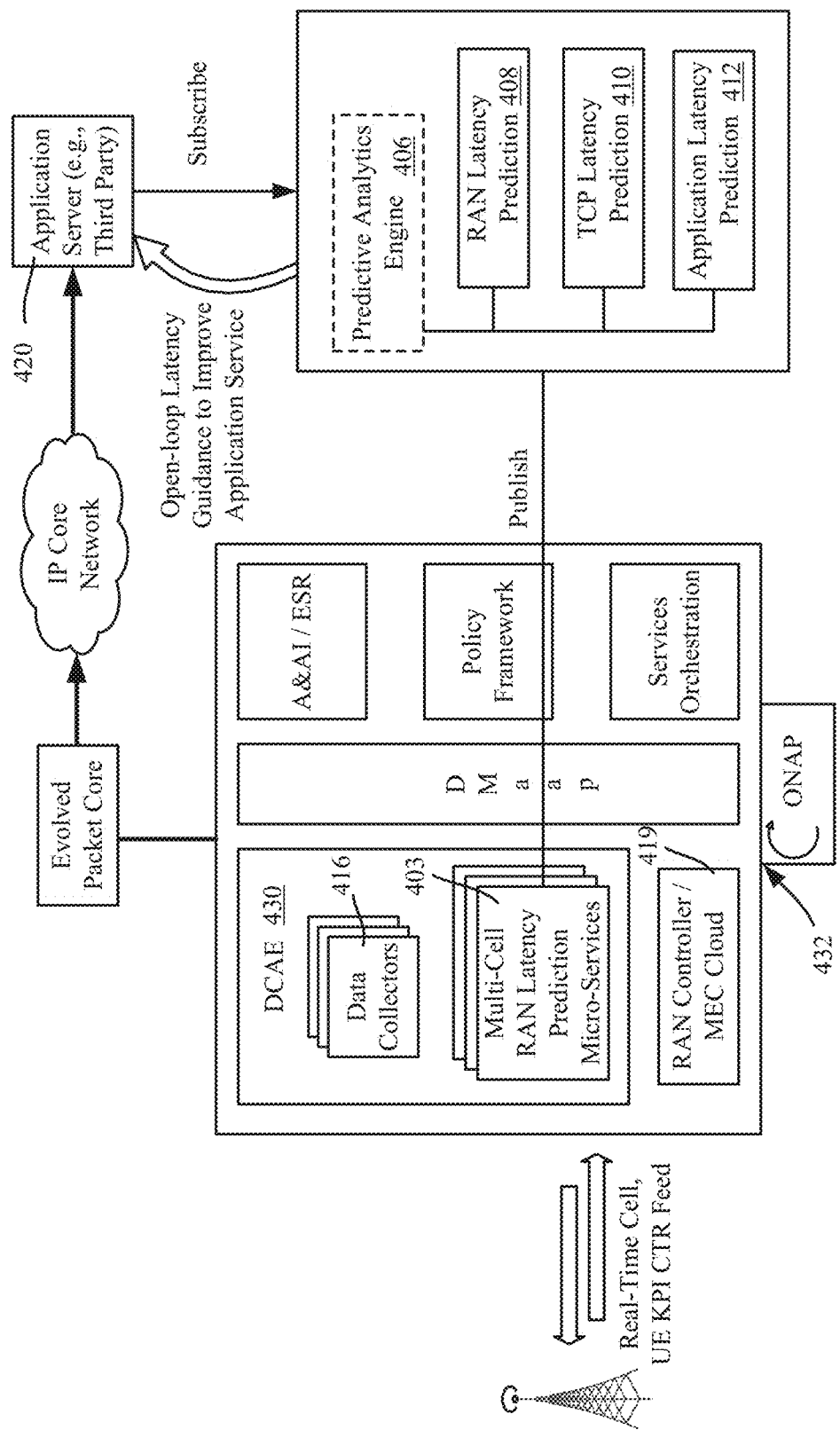
FIG. 4 illustrates an example wireless communication system comprising a latency guidance system for improving third party application server applications to reduce RAN latency, in accordance with various aspects and implementations of the subject disclosure.

FIG. 4 illustrates open-loop third-party application server optimization. In FIG. 4, the RAN latency guidance module 403 containing prediction results can be subscribed by third-party content providers 420, such as 360 degree video streaming servers to optimize their field of view (FoV)-based streaming operations and choice of video quality resolutions for FoV-specific video frames.

Figure 5:
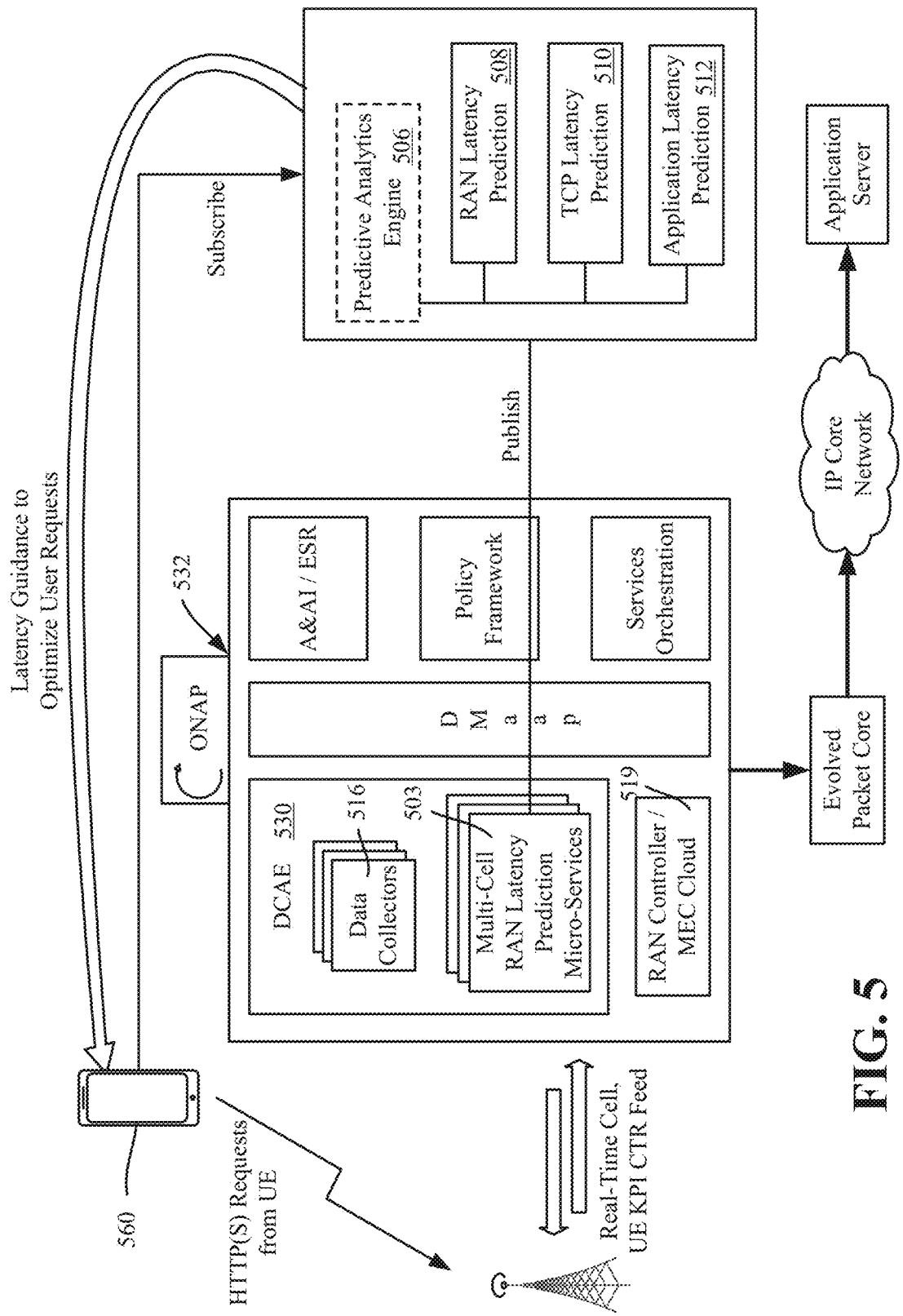
FIG. 5 illustrates an example wireless communication system comprising an online latency guidance system for improving a user equipment's communication (e.g., HTTP(s)) requests to reduce RAN latency, in accordance with various aspects and implementations of the subject disclosure.

FIG. 5 illustrates open-loop optimization of client application requests. In the example use-case of FIG. 5, the RAN latency prediction results are subscribed by the UE's client application 560 to optimize its HTTPS requests for operations such as FoV-based streaming. Another example is to optimize/request a choice of video bit-rate resolutions.

In general, latency can result from many factors/latency impact criteria. For example, downlink RAN latency is based on the total amount of time that it takes for an IP packet to be fully received by a user equipment (UE) from the time it arrived in the LTE base station/eNB from the core network. Downlink RAN latency components comprise initial scheduling delay, the amount of time taken to start transmitting an IP packet to the UE, after it was received by the LTE eNB from the core network. This depends on the amount of packets queued in the eNB buffers and their sizes; higher queuing increases this delay. Radio link control (RLC) delay can result because each IP packet may be subject to segmentation at the link layer, when the available bandwidth for the UE is less than what is required to transmit the entire packet. The resulting packet segment sizes are based on the UE's channel conditions and the amount of frequency-time resources allocated to the UE, which further depend on queuing of packets in the buffers. Each segment, called protocol data unit (PDU), is sent to the lower MAC layer per transmission time interval (TTI) allocated for the UE by the MAC scheduler. The total time taken to send all PDUs of an IP packet to the MAC layer, including those that are re-transmitted, is called the RLC delay. MAC Delay is defined as the amount of time taken for successful over-the-air transmission of each segment from the MAC layer to the UE. MAC delay becomes higher if more HARQ retransmissions are needed to successfully decode the segment at the UE by soft combining. Retransmissions happen when the chosen modulation rate is higher than that supported by the instantaneous channel conditions.

Higher-layer latency is also a consideration. TCP latency results from TCP round trip time (RTT), which is the time it takes for a TCP server to receive acknowledgement for a TCP packet in the uplink, after it transmits the packet to the client UE in the downlink. A higher TCP RTT risks infrequent TCP response time-outs, causing the TCP congestion window to repeatedly enter a slow start phase, adversely impacting performance, especially for large TCP flows. With respect to virtual reality latency, FoV-based streaming is a recent technique proposed to mitigate the enormous bandwidth demands of 360 degree video streaming. FoV-based streaming divides the 360 degree video into different tiles with varying resolutions across FoVs, based on a headset prediction algorithm. Each FoV corresponds to a prediction score, and those with higher and lower scores are streamed at higher and lower resolutions (or not streamed at all), respectively. Unlike traditional video players, FoV-based 360 degree video players maintain smaller playback buffers in the order of units of seconds (around 1-2 s). Otherwise, an FoV prediction error (caused by headset movement in a less-predicted FoV) would make the videos pre-fetched into buffers (based on prediction scores) irrelevant, wasting bandwidth. Once the UE user moves his head to a less-predicted FoV, the video segment in that FoV needs to be quickly fetched to avoid screen blanks or freezes, which occur when the segment-to-be-played is not yet available in the playback buffer, that adversely impact QoE. The amount of time taken for a user to start watching the video segment in his FoV after moving his head is defined as the Motion-to-Photon (MTP) latency.

Turning to characterizing and modeling RAN latency, one suitable (e.g., experimental) setup comprises a 4G LTE eNB, with a 5 MHz cell, connected to the IP core network of a large US national carrier. The eNB has a Base-Band Unit (BBU) controlling radio resource management, decoupled from the remote radio head (RRH) that transmits/receives data. The BBU uses RLC acknowledgment mode (AM) and the RRH uses SISO mode of transmission.

The RRH can be deployed in a 10 by 10 square foot Faraday room, eliminating interference from other transmissions. The BBU is connected to the RRH via a channel emulator with tunable RF attenuators (0 to 25 dB) to generate different fading patterns. The eNB is from a vendor and thus there is no access to its scheduler. Experiments can deploy a varying count of load phone UEs (e.g., between 1 and 10), randomly inside the Faraday room, along with a test UE. The test UE is configured to generates payloads and send them to a remote public IP server. Upon receiving the payload, the server echoes it back to the UE. The other, load UEs stream data in the downlink.

For a second set of virtual-reality-related experiments, an eNB operates on a 10 MHz cell, with the BBU connect to 2 RRHs with dual-polarized antennae using 2×2 MIMO transmission mode. A 360 degree TCP-based FoV video streaming application is run in the test UE, using two test 4K videos encoded at 30 fps. A Man-in-The-Middle (MiTM) proxy tool running on a personal/laptop computer or the like intercepts SSL-encrypted messages between the VR player and its server for extracting application/TCP statistics. To enable decryption, its root SSL certificate is installed as a user-trusted certificate authority on the test UE and both are in the same local network. A test UE (e.g., in the first phase of experiments) operates as a LTE HotSpot, to which the devices are connected, thus being part of the same WLAN. The S7 test UE configures its proxy settings using the IP address of the laptop and the port, in which the proxy is running.

To vary the parameters, approximately 100 experiments were conducted, varying: RF attenuation levels on the channel emulator to generate a range of RSRP values from −80 to −125 dBm on the test (and load) UE, and cell load in terms of the number of UEs connected to the cell and the traffic volume generated by them. The traffic load is changed between full-buffer data stream over TCP for each load UE (utilizing its full RAN capacity) and finite-buffer UDP data stream for each load UE (utilizing a fraction of its capacity). Traffic rate can be varied (not for virtual reality experiments) of the test UE by changing the payload size and inter-packet gap, thereby generating bit-rates from the TCP echo server varying between 50 Kbps and 5 Mbps. For virtual reality experiments, head movement on the VR headset is varied to generate different FoVs.

Suitable datasets, tools, and sources comprise, for RAN metrics, data from both the test UE and the network operator. On the UE, a Qualcomm eXtensible Diagnostic Monitor (QXDM) is used, comprising a sniffer tool that captures LTE PDUs and RAN signaling events with a fine granularity on a per-TTI (1 ms) basis from the S5 phone. PHY layer statistics (e.g., RSRP, RSRQ, SINR, etc. are obtained every 10 ms LTE frame). MAC layer statistics are obtained for each PDU (e.g., allocated PRBs, scheduled TTI, MCS, transport block sizes, ACK/NACK, HARQ re-transmission version, etc.), along with RLC layer statistics (e.g., PDU size, its sequence number, if it is the first/intermediate/last PDU of a packet, its concatenated packets (if any), its TTI, RLC ACK/NACK, etc.) and PDCP layer statistics for each packet (e.g., size, sequence number, the TTI in which it got generated, etc.). The coarse-grained RAN data from the network operator can include, for example, RSRP, RSRQ of the UEs for every 5 seconds, cell PRB utilization and the active number of UEs connected to the cell for every minute, SINR/CQI, initial scheduling, RLC and MAC delays, HARQ ACKs/NACKs, RLC error and packet loss rates, UE throughput, etc. at the end of each session.

With respect to capturing TCP metrics, the experiments capture TCP server-side statistics such as TCP RTT, congestion window, etc. with granularity in the order of units of seconds. Tcpdump captures TCP packets on the rooted test UE and the EC2 server.

For VR metrics, HTTPS requests and responses are intercepted for each FoV-based video segment, to log its adaptive bit-rate, MTP latency, etc. Logcat on the test UE captures Android logs, while streaming the 360 degree video, so as to detect any screen blanking/video freezing events.

To measuring RAN latency, the experiments obtain each MAC PDU, its ACK/NACK information, the redundancy version of its process ID and its previous TTIs, if it underwent re-transmission. This helps compute MAC latency for each PDU. Each MAC PDU corresponds to an RLC PDU generated in the same TTI. Discarding the control PDUs, the RLC data PDUs are sorted based on their sequence numbers. The individual PDCP/IP packets are then extracted from the sorted set of PDUs, using identifier fields to check if the PDU is the first/intermediate/last segment of a packet. The TTI, in which a PDCP packet is generated, corresponds to the last TTI in which any of its RLC PDU segment was received. By logging the TTIs in which all the RLC PDUs are received, the value for RLC latency is obtained. From the tcpdump traces at the server and the test UE, and the core network traces (using probes at the operator), the initial scheduling delay defined herein is obtained. Thus, experiments measure the total RAN latency for each IP packet.

Figure 6A:
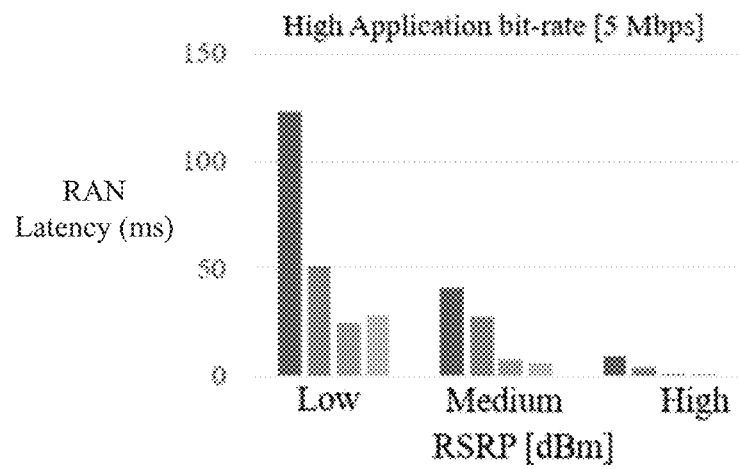
FIGS. 6A-6C are graphical representations characterizing RAN Latency with different cell loads and with high (FIG. 6A), medium (FIG. 6B) and low (FIG. 6C) application bit rates, in accordance with various aspects and implementations of the subject disclosure.
Figure 6B:
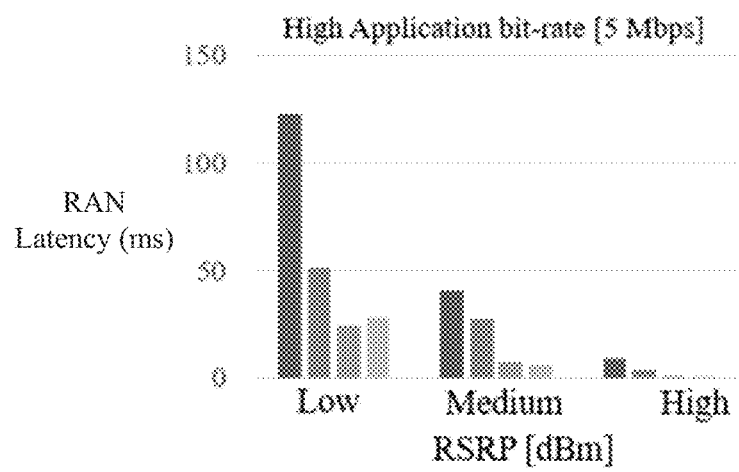
Figure 6C:
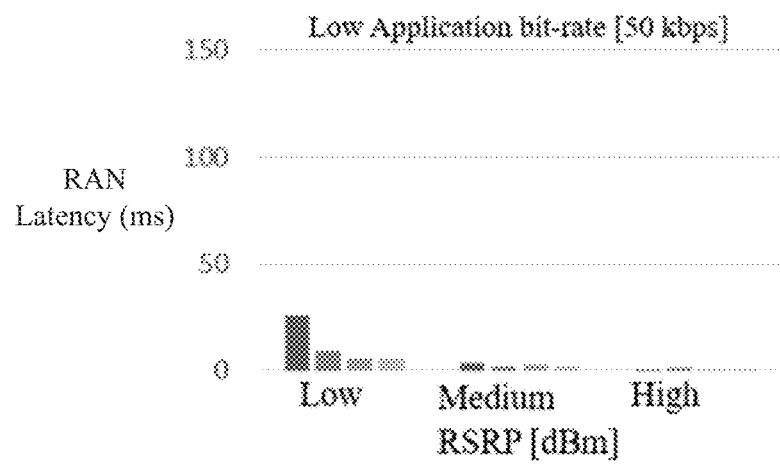

FIGS. 6A-6C plot the RAN latency values while varying RSRP, cell load and application bit-rate. In FIGS. 6A-6C, the UE RSRP is divided into three bins of high (−80 to −95 dBm), medium (−95 to −110 dBm) and low (−110 to −125 dBm), corresponding to 33% quantiles. Note that the sets of four vertical bars, in decreasing darkness from left-to-right, represent high cell load, medium cell load (full) medium cell load (finite) and low cell load, respectively, that is, cell load is divided into 25% quantiles as high (with 8-9 load UEs and 75-100% PRB utilization), medium (with 4-5 load UEs running full-buffer traffic yielding 50-75% PRB utilization or finite-buffer traffic with 30-50% PRB utilization) and low (with 1-2 load UEs and 5-30% PRB utilization). Application bit-rates are quantized as high (5 Mbps), medium (500 kbps) and low (50 kbps). For any given cell load and traffic rate, it can be observed that the RAN latency is a decreasing function of RSRP. This is because a lower RSRP results in a lower RLC PDU size per TTI, causing the IP packet to be segmented into many PDUs and requiring many TTIs. It also triggers HARQ re-transmissions, thereby increasing RAN latency. For any given RSRP and traffic rate, it can be observed that RAN latency is directly correlated with the cell load. A higher cell load causes a higher cell-level PRB utilization, resulting in lower residual PRB utilization for the test UE. This further indicates that the UE is scheduled on fewer PRB s, or less frequently, or both. The former leads to higher segmentation, while the latter indicates larger time gaps between consecutive TTIs in which the UE is scheduled. These factors cause a higher RAN latency.

For a given RSRP and cell load, it can be observed that the RAN latency of the UE is directly correlated with its application bit-rate across FIGS. 6A-6C. A larger IP packet size and smaller inter-packet gaps (causing frequent transmission) increases the bit-rate. The former causes higher segmentation for the same RSRP, while the latter risks queuing of packets in the eNB buffers due to a higher packet arrival rate. This inter-dependency between the RAN KPIs, and their variation across the above settings impacting RAN latency, is described herein.

Figure 7A:
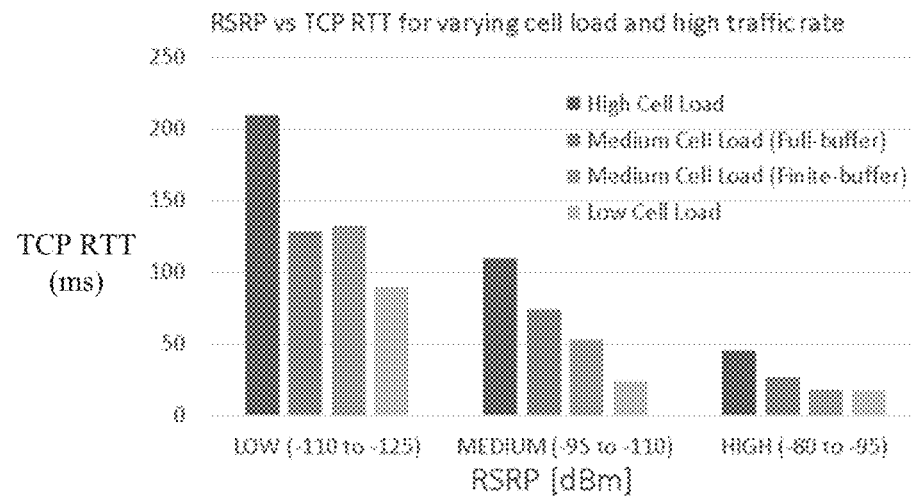
FIGS. 7A-7C are graphical representations characterizing TCOP round trip times (RTT) with different cell loads and with high (FIG. 7A), medium (FIG. 7B) and low (FIG. 7C) application bit rates, in accordance with various aspects and implementations of the subject disclosure.
Figure 7B:
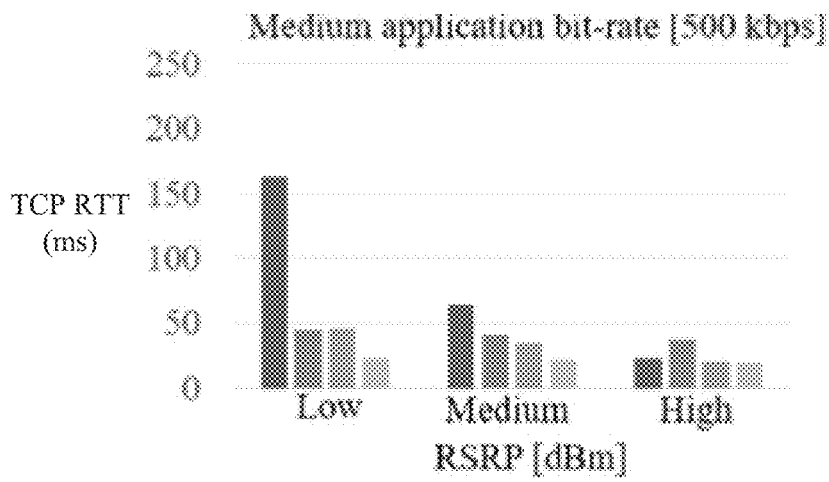
Figure 7C:
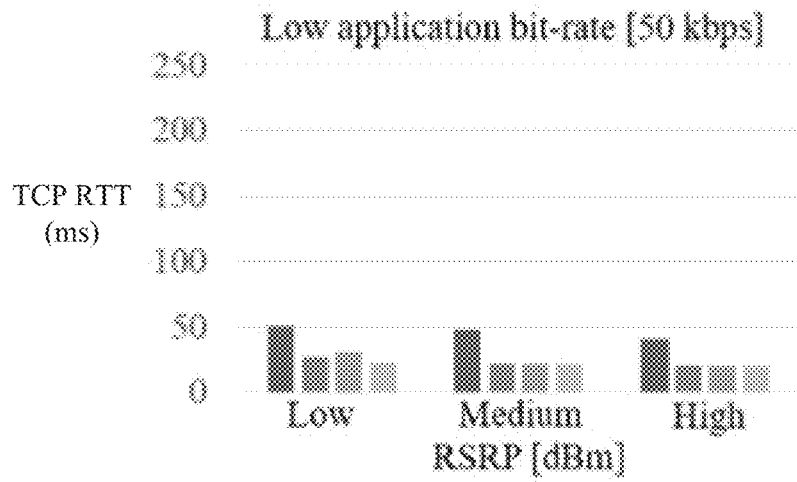

Turning to cross-layer correlation, FIGS. 7A-7C show how downlink RAN latency correlates with higher-layer latencies. In FIGS. 7A-7C, it is seen that the variation and magnitude in TCP RTT correlate with RAN latencies, seen in FIGS. 6A-6C. The Pearson Correlation Coefficient (PCC) is used to calculate the correlation scores between the RAN latency/TCP RTT and the experiment settings in the following Table:

| Experiment Setting | RAN Latency PCC | TCP RTT PCC |
|---|---|---|
| UE RSRP | −0.492 | −0.38 |
| User Load | 0.434 | 0.431 |
| Application bit-rate | 0.323 | 0.364 |
| Traffic Load (Full/Finite) | 0.278 | 0.278 |

It can be observed that the PCC scores for TCP RTT are similar to those for downlink RAN latency. The RSRP has the highest negative correlation with RAN latency, due to the inverse relation. The user load, application bit-rate and traffic load affect the latency in that order. Table 1, along with FIGS. 6A-6C and FIGS. 7A-7C show that RAN latency and TCP RTT are impacted by not just one, but a combination of network settings.

Figure 8A:
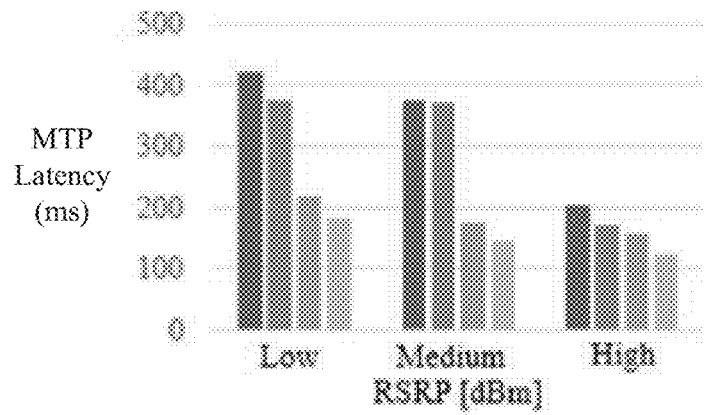
FIGS. 8A-8C are graphical representations showing correlations of RAN latency and TCP RTT with different settings, including motion-to-photon (MTP) latency characterization (FIG. 8A), cross-layer correlation and (FIG. 8B) and cross-dataset corroboration (FIG. 8C), in accordance with various aspects and implementations of the subject disclosure.
Figure 8B:
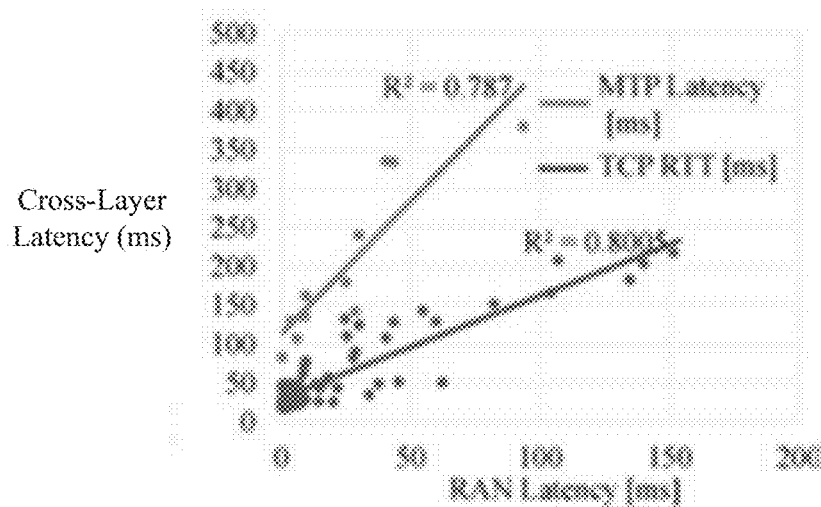

FIG. 8A shows the variation in VR latency by varying the RSRP and cell load. Note that, because a third-party VR application was used, the experiment does not control the application bit-rate, unlike in FIGS. 6A-6C and FIGS. 7A-7C. The VR player uses an adaptive bit-rate algorithm to stream FoV-based video from its server, which can be categorized as high. FIG. 8B evaluates the net correlation between RAN, TCP and MTP latencies across the experiments, given that the VR application uses TCP for streaming; an $R^2$ of 0.8 and 0.78 is seen for RAN latency with TCP and MTP latencies.

Figure 8C:
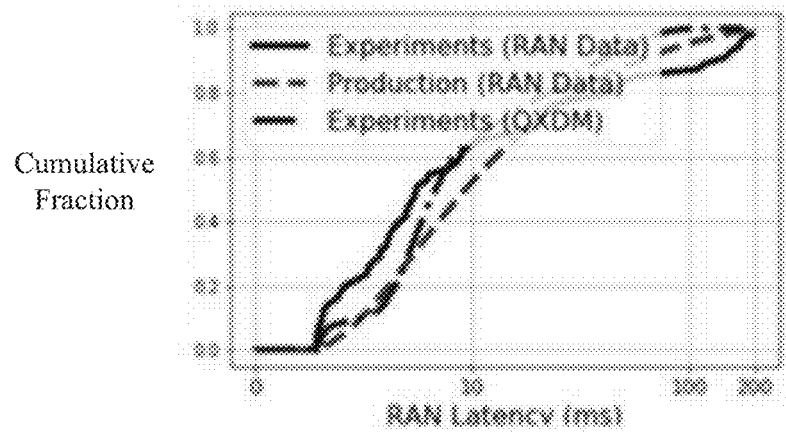

For real-world LTE deployments, FIG. 8C shows that the distribution of RAN latencies from QXDM matches the coarse-grained RAN statistics reported by the operator, covering the experiments and one million RAN sessions collected over two days from the real-world production network of a major market. From this corroboration, the latency measurements from QXDM and a custom parser are validated, and thus experiments with controlled settings are representative of the real-world LTE deployments.

further indicates a lower UE-specific PRB utilization, and hence, a higher RAN latency, as observed in FIGS. 6A-6C.

Turning to aspects of modeling results, machine learning models are developed to estimate and predict RAN latency for the test UE, starting with the fine-grained QXDM datasets. Described herein is the underlying RAN KPIs, impacting latency, that are affected by varying the network settings. These parameters, e.g., the average number of PRBs allocated to the UE, number of RLC PDU segments, RSRP of the UE along with the application bit-rate, are used as the input feature set for the models. To make the models more tractable, the latency is divided into bins to evaluate the accuracy of classification using a simple Random Forest Classification model. The bin boundaries were chosen as 0-10 ms, 10-50 ms, 50-100 ms and 100-200 ms corresponding to 10th, 70th, 90th and 99th percentile latency values of production network data from real-world LTE deployments as shown in FIG. 6A. These bins also correspond to typical latency requirements for VR-like applications.

The QXDM records are aggregated over 100 ms time bins. With a total of 400,000 aggregated records, the data is divided into 80% training data and 20% test data. The process uses 1,000 trees, and uses entropy minimization as the split criteria in the model. The overall F1 score (the harmonic mean of the precision and recall scores) is 0.92. The following Table shows a detailed performance breakdown of the model:

TABLE

Prediction score for random forest classification on QXDM and production data

| Bin | QXDM Precision | QXDM F1 | Prod. Precision | Prod. F1 |
|---|---|---|---|---|
| Overall | 0.92 | 0.92 | 0.64 | 0.66 |
| 0-10 ms | 0.97 | 0.97 | 0.73 | 0.71 |
| 10-50 ms | 0.76 | 0.78 | 0.58 | 0.61 |
| 50-100 ms | 0.62 | 0.62 | 0.54 | 0.56 |
| 100-200 ms | 0.75 | 0.74 | 0.62 | 0.64 |

The following prediction data table (columns 1 and 2) shows the impact scores of these input features in estimating RAN latency from the model, computed by measuring the decrease in node impurity on features:

| | | Prediction R2 for different windows | | | | |
|---|---|---|---|---|---|---|
| Input Feature | Impact Score | 0.1s | 0.2s | 0.5s | 1s | 2s |
| PRB util. | 0.387 | 0.82 | 0.85 | 0.9 | 0.91 | 0.91 |
| RLC PDUs | 0.311 | 0.88 | 0.9 | 0.94 | 0.94 | 0.93 |
| RSRP | 0.168 | 0.995 | 0.994 | 0.99 | 0.987 | 0.99 |
| Packet size | 0.132 | | | N/A | | |

Figure 9A:
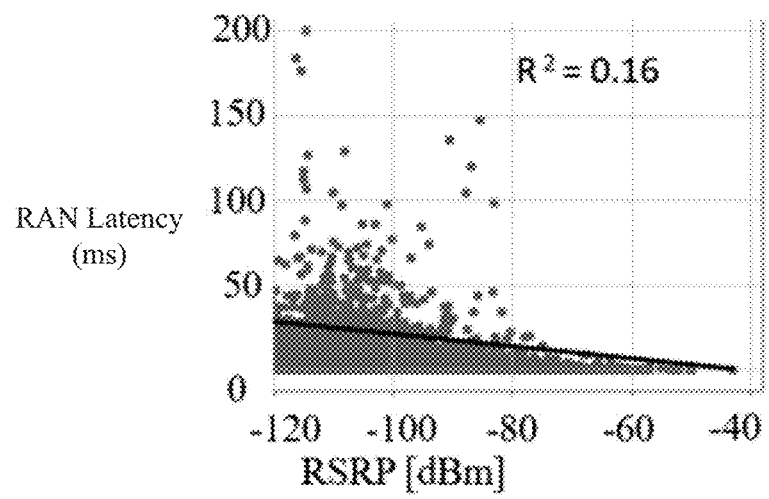
FIGS. 9A-9C are graphical representations illustrating the impact of RAN performance indicators on downlink RAN latency LTE networks, in accordance with various aspects and implementations of the subject disclosure.
Figure 9B:
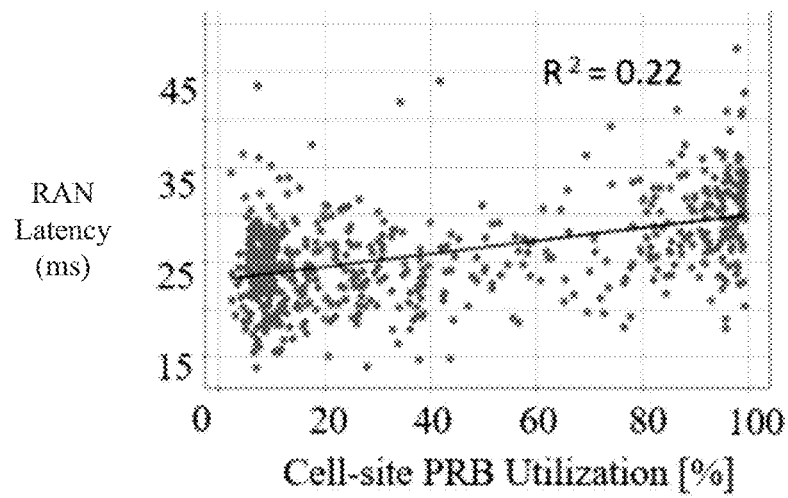
Figure 9C:
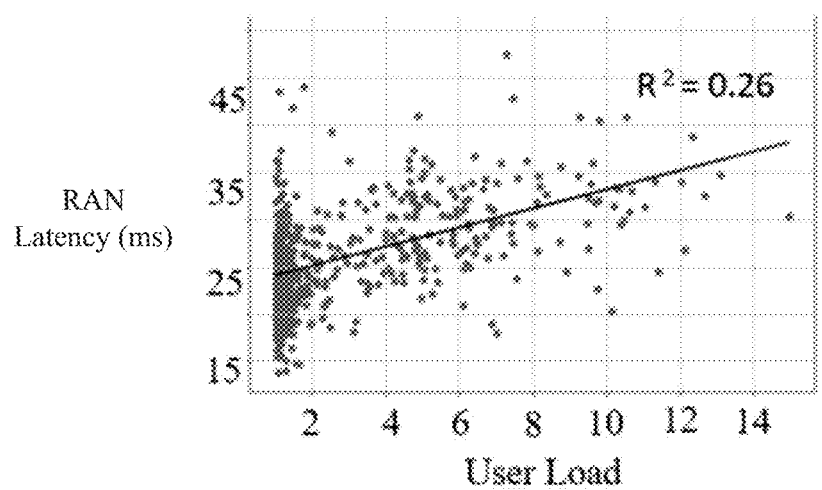

FIGS. 9A-9C present some representative results from real-world LTE deployments of the operator, illustrating the impact of RAN KPIs on downlink RAN latency in real-world LTE networks. FIG. 9A shows the impact of the RSRP of the UEs across a group of cells on their RAN latency; the lower the RSRP, higher the RAN latency, and vice-versa, as observed from experimental results. FIGS. 9B and 9C take one particular cell from the operator's real-world network; FIGS. 9B and 9C show the impact of the total cell-site PRB utilization (an aggregate of PRB utilization of all UEs in the cell) and the user load in the cell on RAN latency. The higher user load indicates a higher cell-site PRB utilization, which It can be observed that the PRB utilization and the number of RLC PDUs for the UE have a significant impact on RAN latency, followed by RSRP and packet size. A near-term prediction of these RAN parameters is performed (except packet size, as that is not a RAN-specific KPI) for different time slot lengths ranging from 100 ms to 2s and predicting the performance at the subsequent future time slot. The Exponential Weighted Moving Average (EWMA) is used in the 20% test data to predict RSRP and number of RLC PDUs. To predict PRB utilization, a random forest regression model is built with input features as TTI, UE RSRP, and PRB utilization over the past ten time slots. The results in the prediction data Table (columns 3-7) show that the RAN metrics can be predicted with an R2 score of greater than 0.9 except when the time slot size is 100 ms. Further, the overall weighted F1 score of RAN latency prediction is greater than 0.8.

Turning to predicting latency from network RAN data from the (e.g., one million) RAN sessions, the input features for this model based on network data include RSRP/RSRQ, cell load, traffic volume, and cell-specific PRB utilization, which are closely related to the experiment variates described herein. The same number of trees and split criteria as in the QXDM model can be used, similarly dividing the session records into 80% training data and 20% test data. The performance is summarized in the prediction Table. Due to the coarser granularity of data, the overall F1 score on the test set is 0.66. However, very low latency (0-10 ms) and very high latency bins (100-200 ms) are predicted with higher accuracy.

Figure 10A:
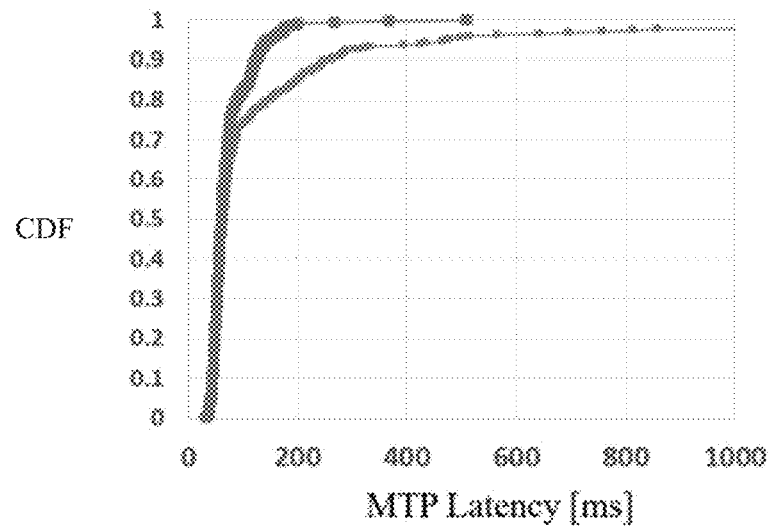
FIGS. 10A and 10B are graphical representations illustrating improvements in virtual reality latency resulting from a model-triggered RAN handover, in accordance with various aspects and implementations of the subject disclosure.
Figure 10B:
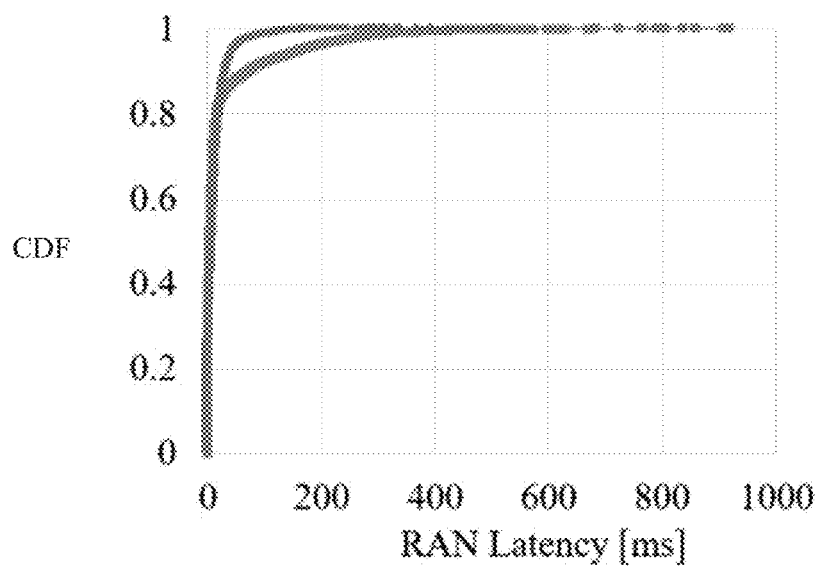

The models described herein were used to trigger optimized RAN handovers to improve VR latency. The representative results are shown in FIGS. 10A and 10B. A topology of 4 LTE cells with different combinations of network settings was emulated, with the VR application run in this topology. Note that each phone is originally connected to a cell from which it receives the highest RSRP. The test phone streaming 360 degree video over TCP on its FoV-based player initially connects to a cell with the following setting: {RSRP: high, Cell Load: high}. Observed is a baseline MTP latency of 150 ms with a 95th percentile latency of 488 ms.

Despite the higher RSRP, the latency is increased by lower PRB utilization and higher number of RLC PDUs, arising from high user load and full-buffer traffic. By handovers to other cells with low/medium cell loads, albeit with poorer RSRP, the MTP latency can be reduced by up to 50% to about 75 ms and a 95th percentile latency of 148 ms as seen in FIG. 10A. Even though the RSRP is lower, the gain in latency comes from higher residual PRBs for the UE (which has a larger impact, as seen in the Tables). The 50th percentile MTP latency of 60 ms is achieved, which is the acceptable limit. The number of blanking events (measured from Android logs) can be reduced by up to 16% (from 63 at 1.2 s per event to 52 at 0.871 s per event).

As described above (e.g., with reference to FIGS. 1 and 4), the latency guidance models can be used to improve IP throughput by open-loop optimization that optimizes the application bit-rate (i.e. by changing IP packet size and inter-packet gaps) for improved third-party content delivery. A larger RAN latency, causing a higher TCP RTT, can result in frequent dips or a conservative increase in TCP congestion window size, which may adversely impact IP throughput. As described herein, a larger IP packet size (causing higher application bit-rate) can cause a higher RAN latency.

Figure 11A:
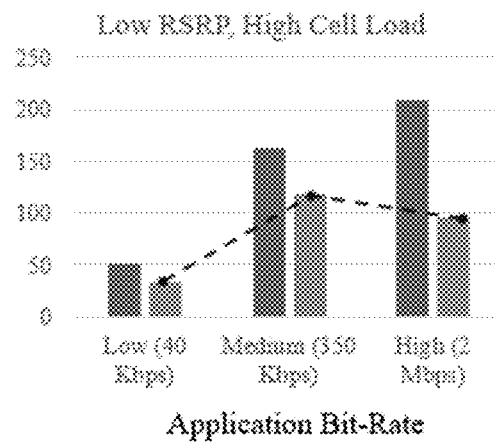
FIGS. 11A-11C are graphical representations characterizing implications of latency on metrics, including reference signal received power and cell load with respect to application bit rates, in accordance with various aspects and implementations of the subject disclosure.
Figure 11B:
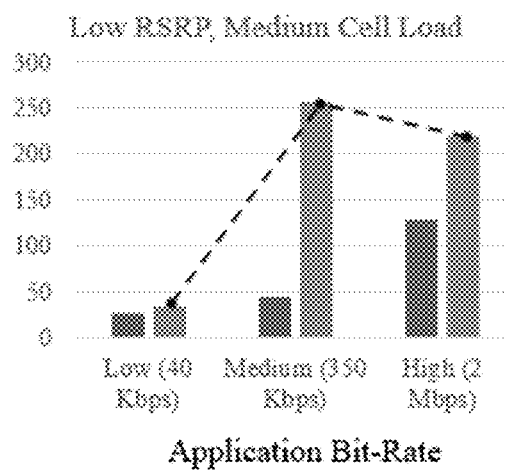
Figure 11C:
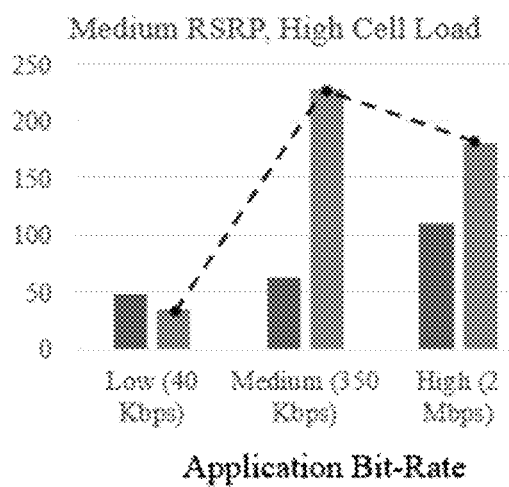

FIGS. 11A-11C show the Implication of latency on other metrics via three scenarios, in which a higher application bit-rate (caused by larger packet sizes), in fact, reduces IP throughput due to increase in TCP RTT, while a lower bit-rate (caused by smaller packets) results in increased IP throughput by up to 25%. Note that the pairs of vertical bars in FIGS. 11A-11C represent, from left-to-right, TCP RTT (in ms) and IP throughput (in Kbps), respectively. Also described herein is the impact of TCP RTT on TCP congestion window for high- and low-latency scenarios.

Figure 12:
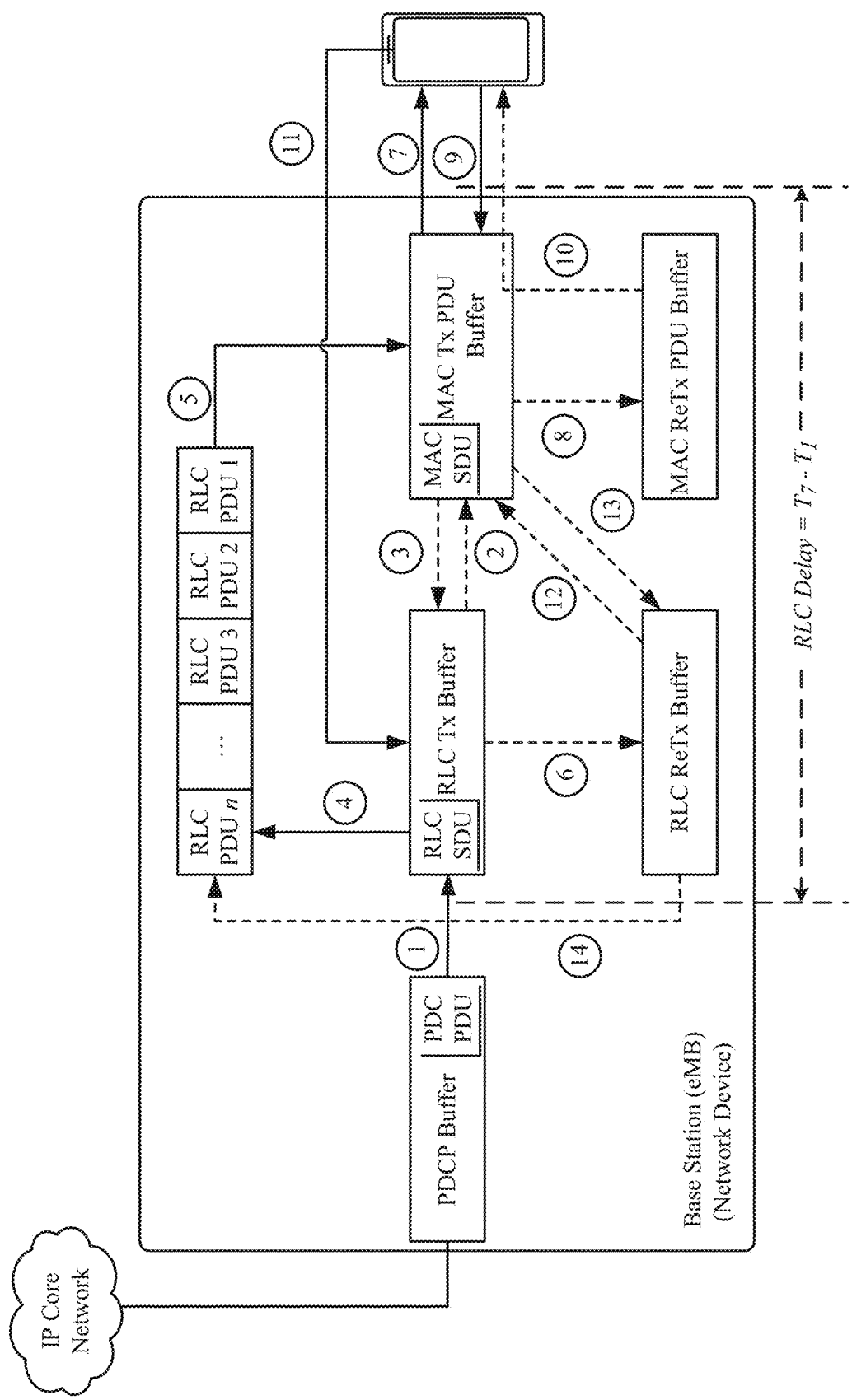
FIG. 12 is a block/dataflow diagram representing downlink RAN functionality operations illustrating data going through an LTE protocol stack to a user equipment, in accordance with various aspects and implementations of the subject disclosure.

FIG. 12 shows a sequence of operations (e.g., via numerically labeled arrows) showing how data goes through the LTE protocol stack and on to the UE, including MAC and RLC re-transmissions. Starting with arrow (1) PDCP PDUs corresponding to a UE are sent to the RLC layer and become RLC SDUs. Via arrow (2), the RLC layer informs the MAC layer of "new data arrival." Based on the UE's network conditions and achievable rate, (arrow (3)) the MAC layer allocates PRBs to the UE across certain TTIs and sends a "Transmission (Tx) opportunity" to the RLC layer with the recommended Transport Block Size (TBS). The PDCP PDUs remain in the PDCP buffer until the completion of this step. The RLC layer segments (or concatenates) RLC SDUs to smaller (larger) RLC PDUs based on the recommended TBS and allocated PRBs, which are queued in the RLC buffer (arrow (4)). As represented by arrow (5), one RLC PDU from the from the RLC buffer is transmitted per Tx opportunity to the MAC layer. At arrow (6), a copy of each RLC PDU is stored in the RLC re-transmission buffer until the RLC PDU is successfully transmitted (indicated by RLC ACK). If an ACK is received, the RLC PDU is discarded from the re-transmission buffer, else it is fetched from the buffer for retransmission.

As represented by arrow (7), the MAC layer receives the RLC PDU from (arrow 5) as a MAC SDU, schedules the transmission using the chosen modulation rate, and multiplexes the MAC SDUs onto the PRBs scheduled in the TTI. As represented by arrow (8), The MAC layer stores a copy of the resulting MAC PDU in a re-transmission buffer.

As represented by arrow (9), for each MAC PDU transmitted in (arrow 7), the UE sends a HARQ ACK/NACK to the eNB. As represented by arrow (10), if a HARQ NACK is received, the MAC layer retrieves PDU from the retransmission buffer and re-transmits using a different MCS. This process is continued until either successful transmission, or the maximum re-transmission limit is reached.

As represented by arrow (11), in case if a maximum retry limit is reached, the UE sends an RLC NACK to the eNB. As represented by arrow (12), if the UE sends an RLC NACK for the PDU, then the PDU is retrieved from the re-transmission buffer and the MAC layer is notified of "data arrival". The MAC layer performs MCS rate and PRB resource allocation at a convenient TTI, and (arrow (13)) responds back with the "Tx opportunity", hinting at any further segmentation/concatenation involving the PDU. As represented by arrow (14), the new RLC PDUs are sent to the RLC buffer, and the process repeats from (arrow (5)). This cycle repeats until the UE successfully receives the RLC PDU or the number of RLC re-transmissions reach the maximum limit, in which case it is considered a PDCP packet loss.

Figure 13A:
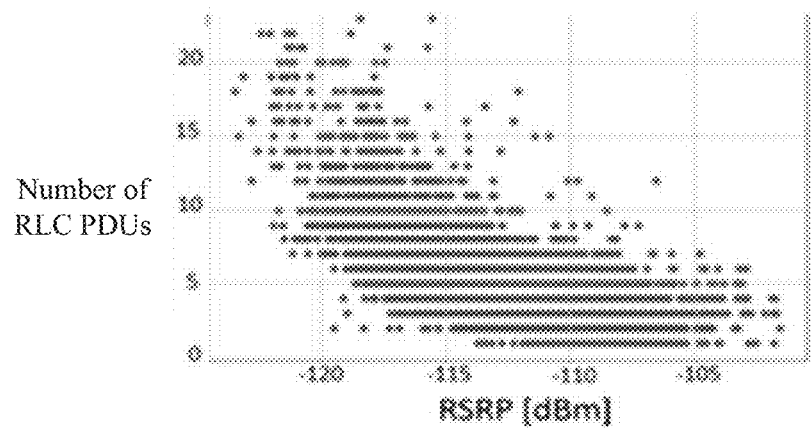
FIGS. 13A-13C are graphical representations characterizing interdependencies between RAN performance indicators, in accordance with various aspects and implementations of the subject disclosure.
Figure 13B:
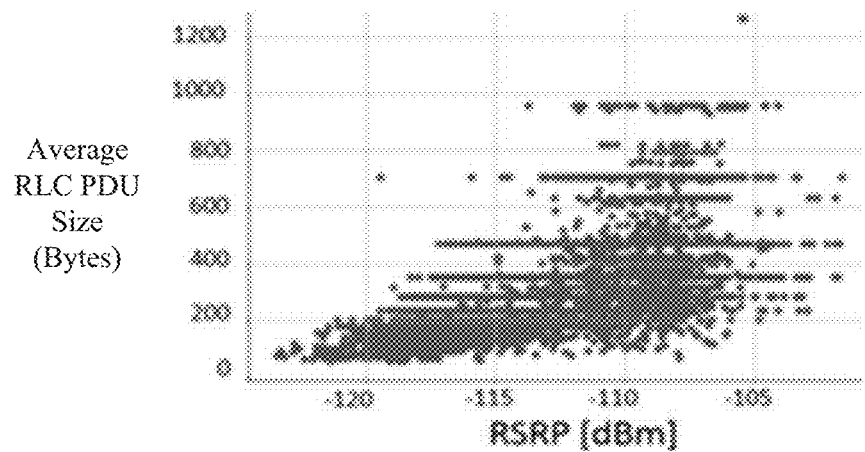

FIGS. 13A and 13B show the impact of RSRP of the UE on the number of RLC PDUs and the average RLC PDU size. A low RSRP indicates poor RF conditions for the UE, which results in lower PDU sizes and modulation rates for transmission to the UE scheduled on any given set of PRBs (determined by the MAC scheduler) per TTI, as observed in FIG. 13B, a lower RLC PDU size indicates a higher number of PDUs, caused by segmentation of an IP packet, as seen in FIG. 13A.

Figure 13C:
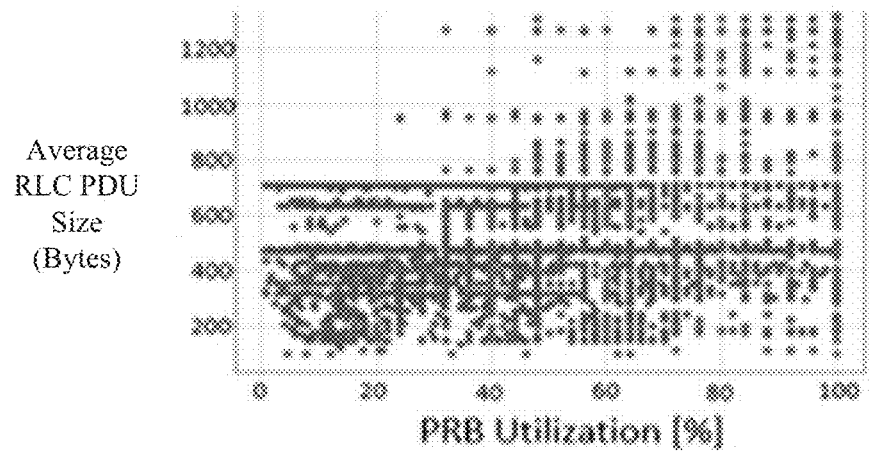
Figure 14A:
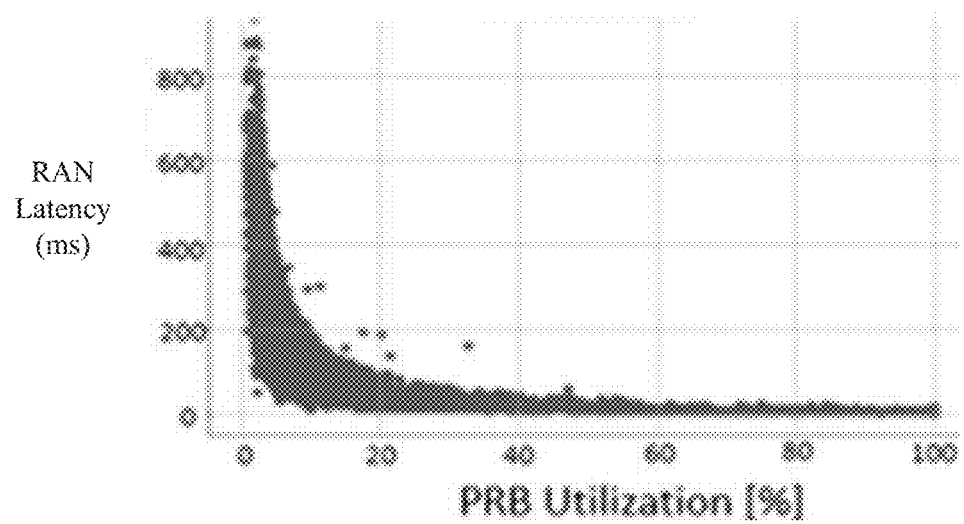
FIGS. 14A-14C are graphical representations characterizing interdependencies between RAN performance indicators, in accordance with various aspects and implementations of the subject disclosure.

FIG. 13C shows the impact of PRB utilization on the RLC PDU size. For a given RF condition of the UE, a higher PRB utilization for the UE yields a higher RLC PDU size for the UE, which in turn results in lower number of PDUs, caused by segmentation. Thus, it takes a fewer number of TTIs to schedule the individual PDU segments of an IP packet and hence, a lower RAN latency, as observed in FIG. 14A.

Figure 14B:
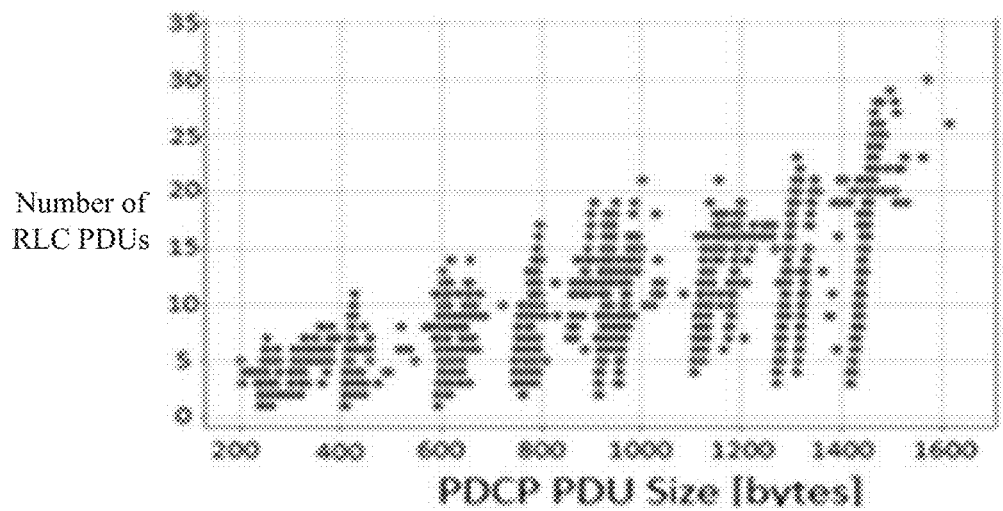
Figure 14C:
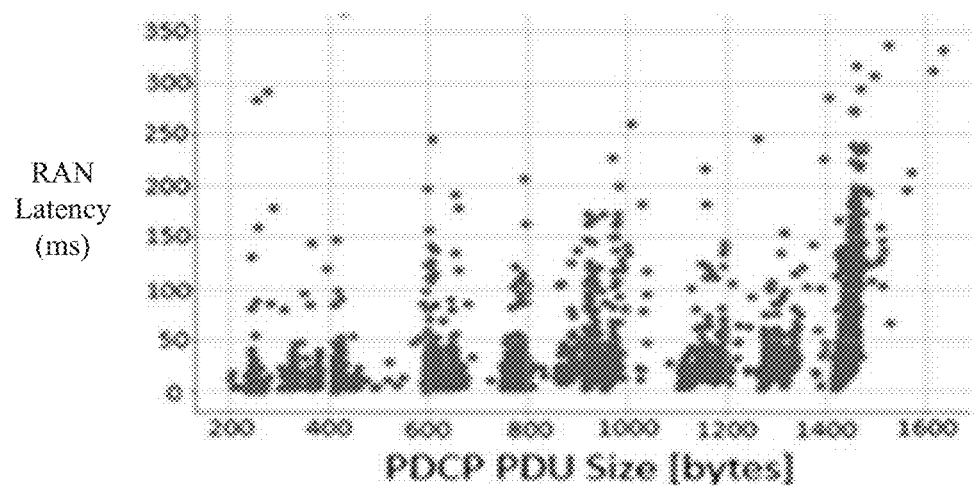

FIG. 14B shows that a higher IP packet size results in a higher number of RLC PDU segments, for the given RF conditions of the UE and the set of PRBs allocated to it. This results in a higher RAN latency, as seen in FIG. 14C.

Figure 15A:
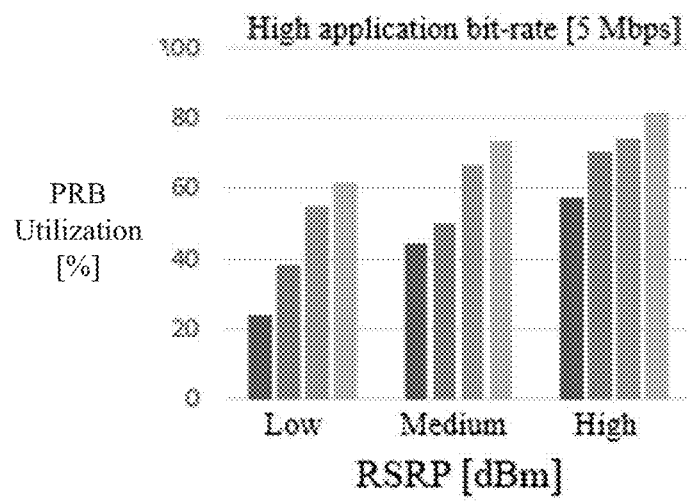
FIGS. 15A-15C are graphical representations illustrating user equipment physical resource block (PRB) utilization with different cell loads and with high (FIG. 15A), medium (FIG. 15B) and low (FIG. 15C) application bit rates, in accordance with various aspects and implementations of the subject disclosure.
Figure 15B:
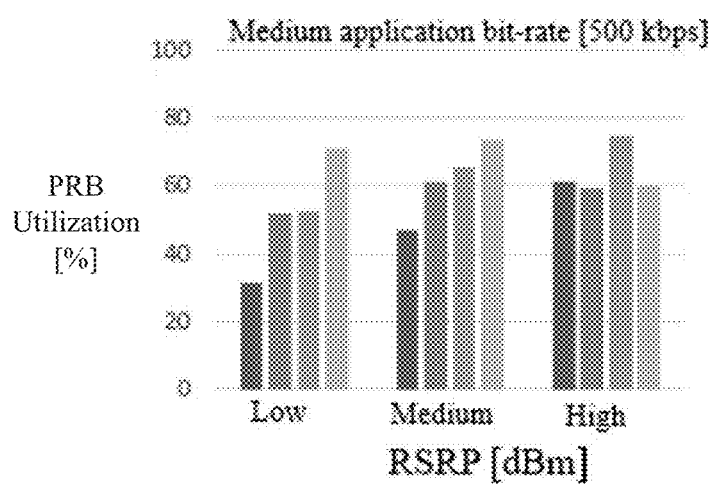
Figure 15C:
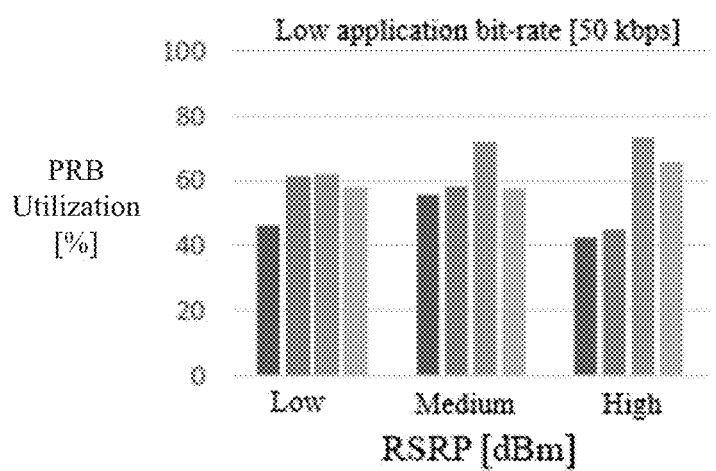

FIGS. 15A-15C characterize the variation in PRB utilization of the UE for varying RSRP values across varying cell load and application bit-rates. When an eNB often has UE data in its buffers, it can be seen that the higher the RSRP for the UE, the higher the amount of PRBs allocated to the UE. For any RSRP, when the cell load decreases, the PRB utilization for a UE increases, and vice-versa. Similarly, with decreasing application bit-rate, as long as the eNB has data for the UE in its buffers, the PRB utilization for the UE increases. Sometimes, when the application bit rate is low and the RSRP is high, the PRB utilization may decrease due to less-frequent availability of data in the eNB's buffers for the UE, caused by quicker transmission of data and emptying of UE buffers at the eNB as a result of lower packet size and higher RSRP.

Figure 16A:
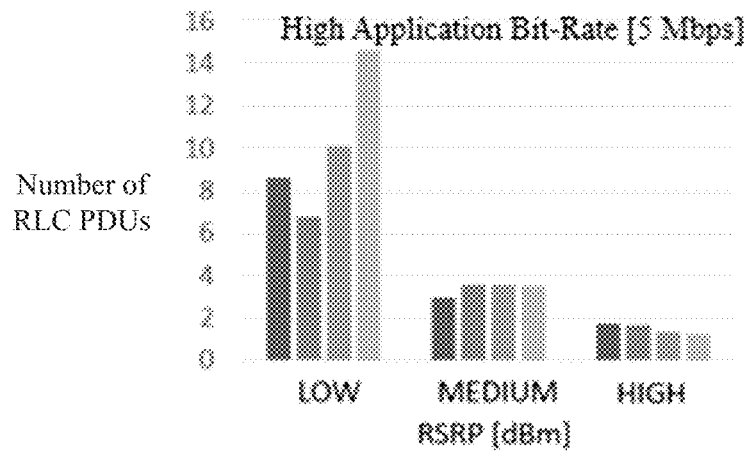
FIGS. 16A-16C are graphical representations illustrating radio link control (PLC) protocol data units (PDUs) usage with different cell loads and with high (FIG. 16A), medium (FIG. 16B) and low (FIG. 16C) application bit rates, in accordance with various aspects and implementations of the subject disclosure.
Figure 16B:
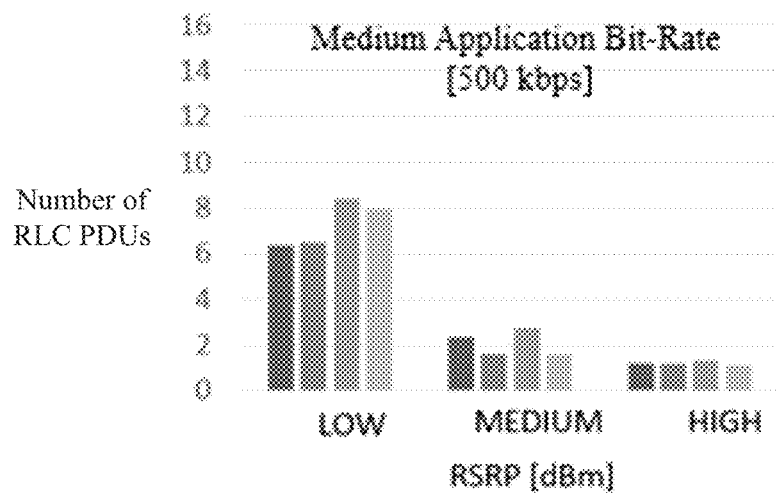
Figure 16C:
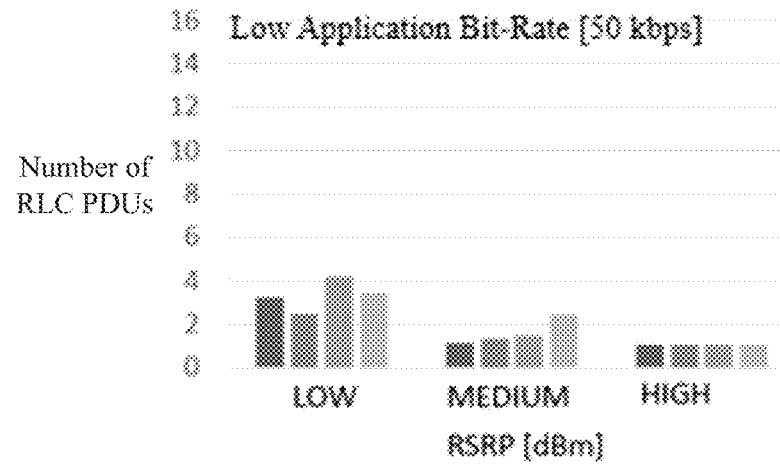

FIGS. 16A-16C characterize the variation in average number of RLC PDU segments of an IP packet served to the UE for different RSRP, cell load and application bit-rates. It is seen that the measured quantity decreases with increase in RSRP of the UE, because a higher RSRP yields a higher RLC PDU size, for a given application bit-rate. It is also seen that the measured quantity decreases with decrease in the application bit-rate, because a lower IP packet size (causing a lower bit-rate) results in a lower number of RLC PDU segments, for the given RSRP and cell load conditions.

Figure 17A:
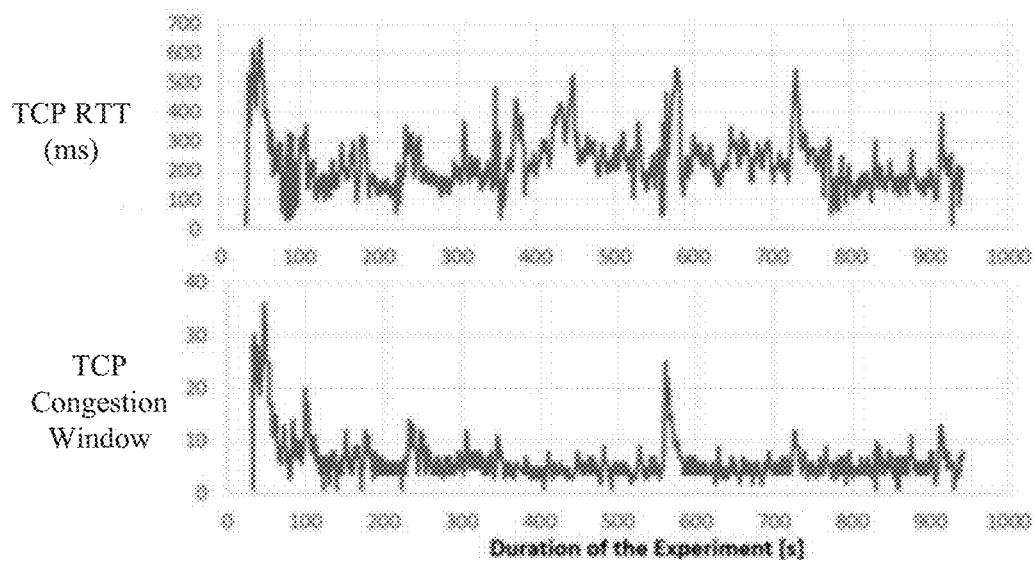
FIGS. 17A and 17B are graphical representations illustrating relationships between TCP RTT and TCP congestion window over time, in accordance with various aspects and implementations of the subject disclosure.
Figure 17B:
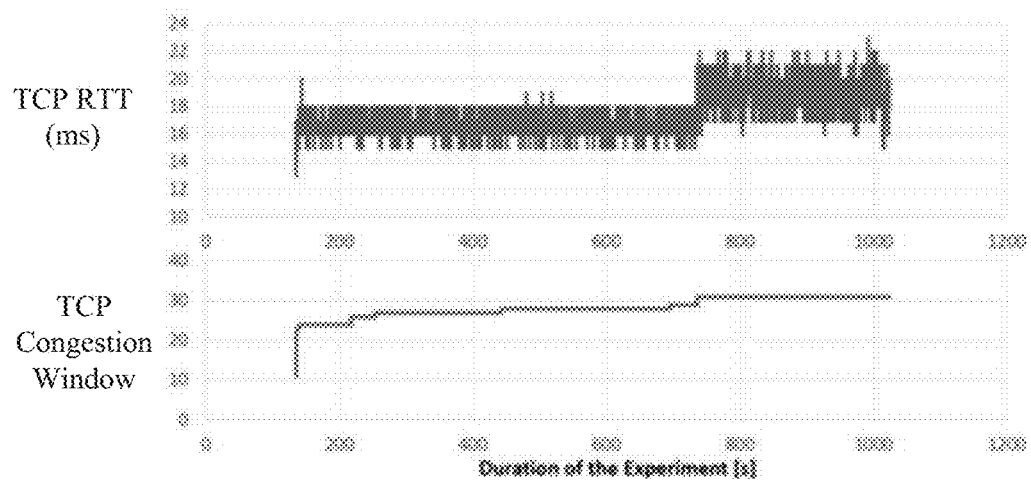

FIGS. 17A and 17B illustrate the relationship between TCP RTT and congestion window for two TCP data streaming sessions, using TCP CUBIC, with varying RF conditions. FIG. 17A shows very high RTT values, averaging at 218 ms, with a maximum at 647 ms. Correspondingly, it is seen that the TCP congestion window frequently enters the slow-start phase due to frequent TCP RTOs. A higher number of TCP re-transmissions, which is the other potential cause for a higher TCP RTT, additionally prevents the TCP congestion window from growing consistently (average value 7). FIG. 17B shows lower RTT values, averaging at 17 ms, and peaking at 23 ms. Correspondingly, it is seen that the TCP congestion window is consistently growing in the congestion avoidance phase (average value 24). The TCP congestion window does not enter the slow start phase again, and the TCP re-transmissions are minimal in this case.

Figure 18:
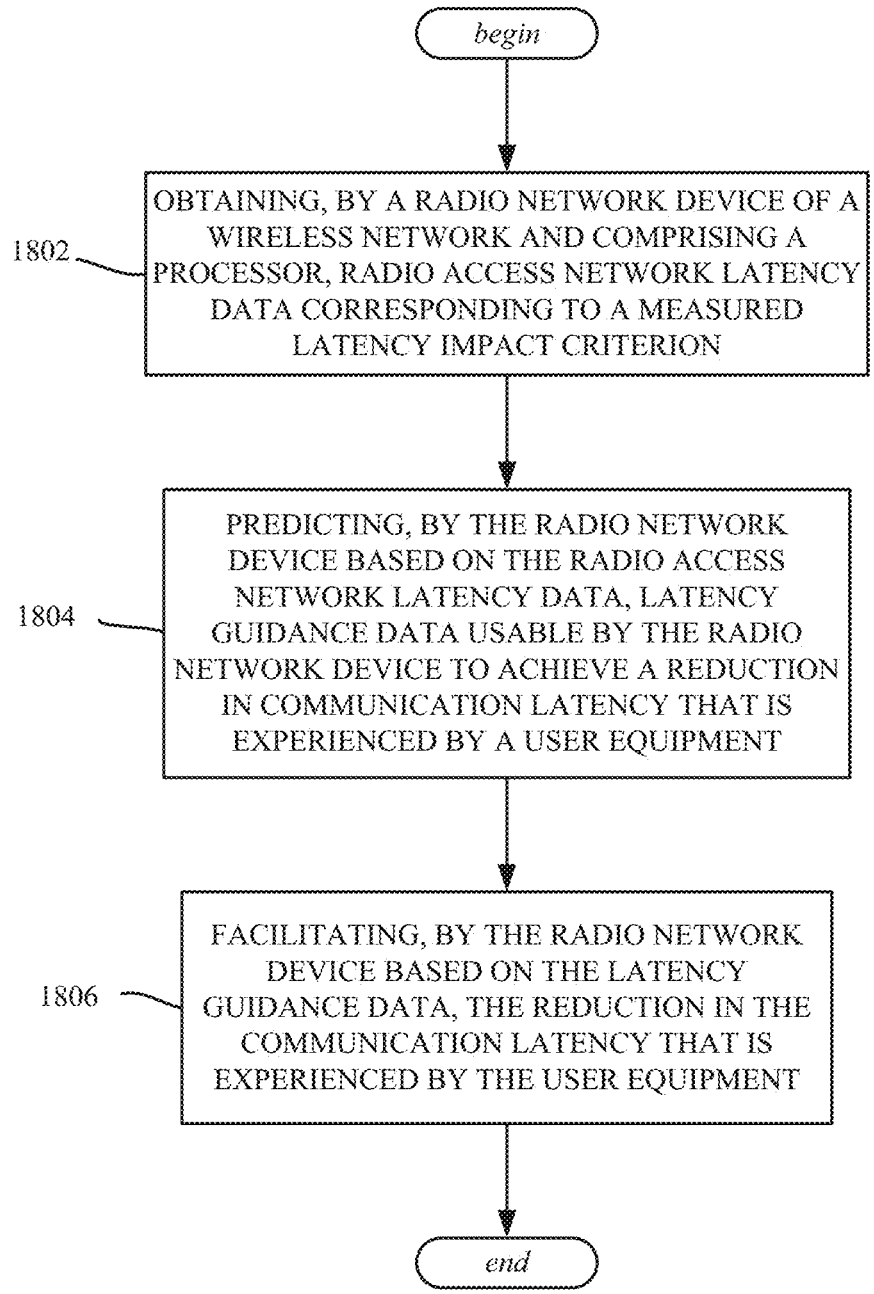
FIG. 18 illustrates a flow diagram directed towards example operations for using measured latency impact criterion to predict latency guidance information for reducing RAN latency, in accordance with various aspects and implementations of the subject disclosure.

One or more aspects, generally represented in FIG. 18, represent example operations, comprising obtaining (operation 1802), by a radio network device of a wireless network and comprising a processor, radio access network latency data corresponding to a measured latency impact criterion. Operation 1804 represents predicting, by the radio network device based on the radio access network latency data, latency guidance data usable by the radio network device to achieve a reduction in communication latency that is experienced by a user equipment. Operation 1806 represents facilitating, by the radio network device based on the latency guidance data, the reduction in the communication latency that is experienced by the user equipment.

The measured latency impact criterion can be measured at a base station device of the wireless network or at the user equipment coupled to the base station device, and obtaining the radio access network latency data corresponding to the measured latency impact criterion can comprise receiving, from a message router device coupled to the base station device, at least one of: spectrum utilization information representative of a first measure of a utilization of spectrum by network devices of the wireless network, signal quality information representative of a second measure of a signal quality experienced by the user equipment of the wireless network, cell load information representative of a third measure of a load on cell devices of the wireless network, or traffic-related information representative of a fourth measure of traffic experienced by the network devices of the wireless network.

Predicting can comprise processing the radio access network latency data via a machine-learned model into the latency guidance data. Processing the radio access network latency data via the learned model can comprise inputting, into the machine-learned model, at least one of: spectrum utilization information representative of a first measure of a utilization of spectrum by network devices of the wireless network, signal quality information representative of a second measure of a signal quality experienced by the user equipment of the wireless network, cell load information representative of a third measure of a load on cell devices of the wireless network, or traffic-related information representative of a fourth measure of traffic experienced by the network devices of the wireless network.

Facilitating the reduction in the communication latency that is experienced by the user equipment can comprise publishing the latency guidance data to a subscriber device of the wireless network.

The latency guidance data can correspond to a load-balancing recommendation, and facilitating the reduction in the communication latency that is experienced by the user equipment can comprise providing the latency guidance data to a radio access network controller that performs load-balancing operations with respect to network devices of the wireless network.

The latency guidance data can correspond to a handoff recommendation, and facilitating the reduction in the communication latency that is experienced by the user equipment can comprise providing the latency guidance data to a radio access network controller that performs handoff operations with respect to transferring user equipment connections from a first base station device to a second base station device of the wireless network.

The latency guidance data can correspond to an edge computation recommendation, and facilitating the reduction in the communication latency that is experienced by the user equipment can comprise providing the latency guidance data to an edge device that performs edge computation operations on behalf of core network devices of the wireless network.

The measured latency impact criterion can be measured at a base station device of the wireless network that performs data scheduling operations with respect to scheduling communication of data by network devices of the wireless network, the latency guidance data can correspond to a data scheduling recommendation for the network devices, and facilitating the reduction in the communication latency that is experienced by the user equipment can comprise providing the latency guidance data to the base station device for use in the data scheduling operations.

Facilitating the reduction in the communication latency that is experienced by the user equipment can comprise providing the latency guidance data to a network device associated with a content provider for use in adjusting a content output variable applicable to content being transmitted to the user equipment. Facilitating the reduction in the communication latency that is experienced by the user equipment can comprise providing the latency guidance data to the user equipment for use in modifying requests for content.

Facilitating the reduction in the communication latency that is experienced by the user equipment can comprise providing the latency guidance data to a radio access network controller and a base station device for use in determining radio access network slicing operations in connection with network slices of the wireless network.

Figure 19:
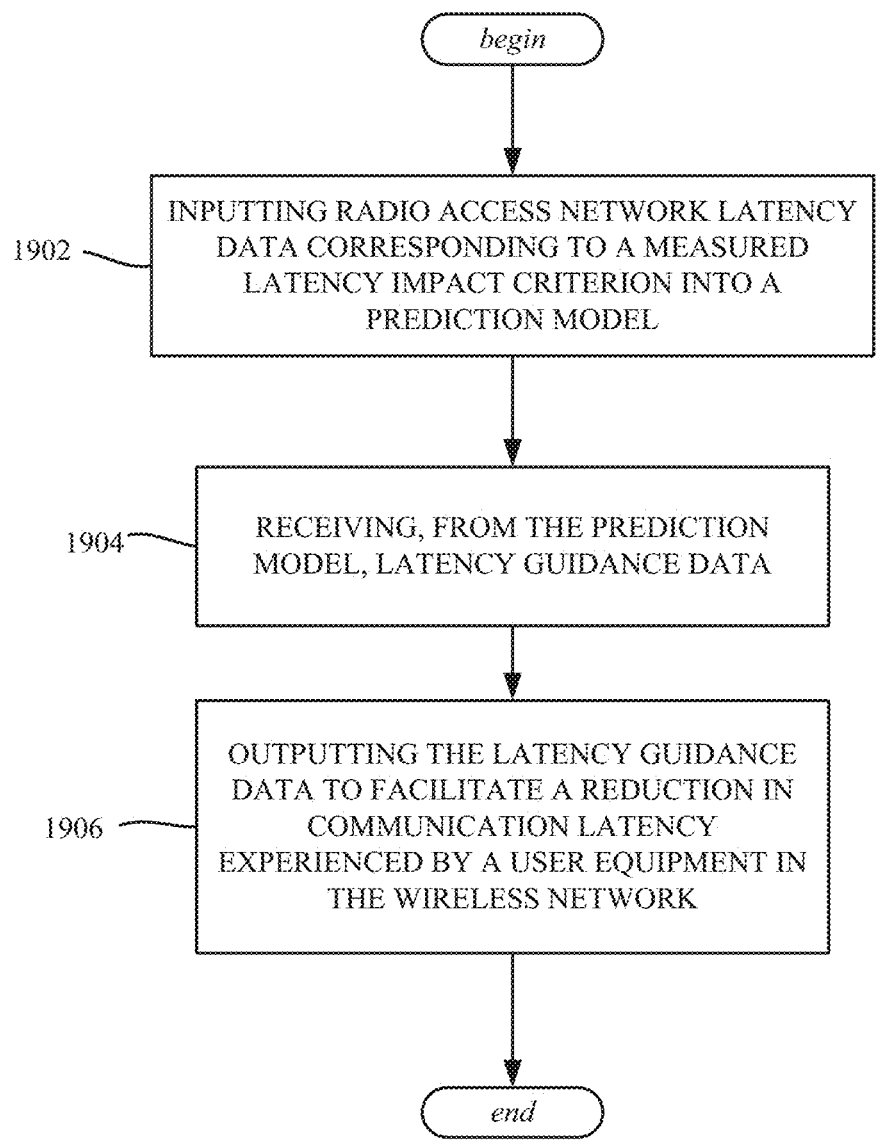
FIG. 19 illustrates a flow diagram directed towards example operations for using a model to receive latency guidance information for reducing RAN latency, in accordance with various aspects and implementations of the subject disclosure.

FIG. 19 represents an example system, e.g., comprising a processor and a memory that stores executable instructions that, when executed by the processor, facilitate performance of example operations. Operation 1902 represents inputting radio access network latency data corresponding to a measured latency impact criterion into a prediction model. Operation 1904 represents receiving, from the prediction model, latency guidance data. Operation 1906 represents outputting the latency guidance data to facilitate a reduction in communication latency experienced by a user equipment in the wireless network.

The measured latency impact criterion can comprise a function of at least one of: spectrum utilization information representative of a first measure of a utilization of spectrum by network devices of the wireless network, signal quality information representative of a second measure of a signal quality experienced by the user equipment of the wireless network, cell load information representative of a third measure of a load on cell devices of the wireless network, or traffic-related information representative of a fourth measure of traffic experienced by the network devices of the wireless network.

Outputting the latency guidance data to facilitate the reduction in the communication latency experienced by the user equipment in the wireless network can comprise outputting the latency guidance data to at least one of: a radio access network controller, an edge network device, a base station device, a content provider, or the user equipment. Outputting the latency guidance data to facilitate the reduction in the communication latency experienced by the user equipment in the wireless network can comprise publishing the latency guidance data to a subscriber device in the wireless network.

Figure 20:
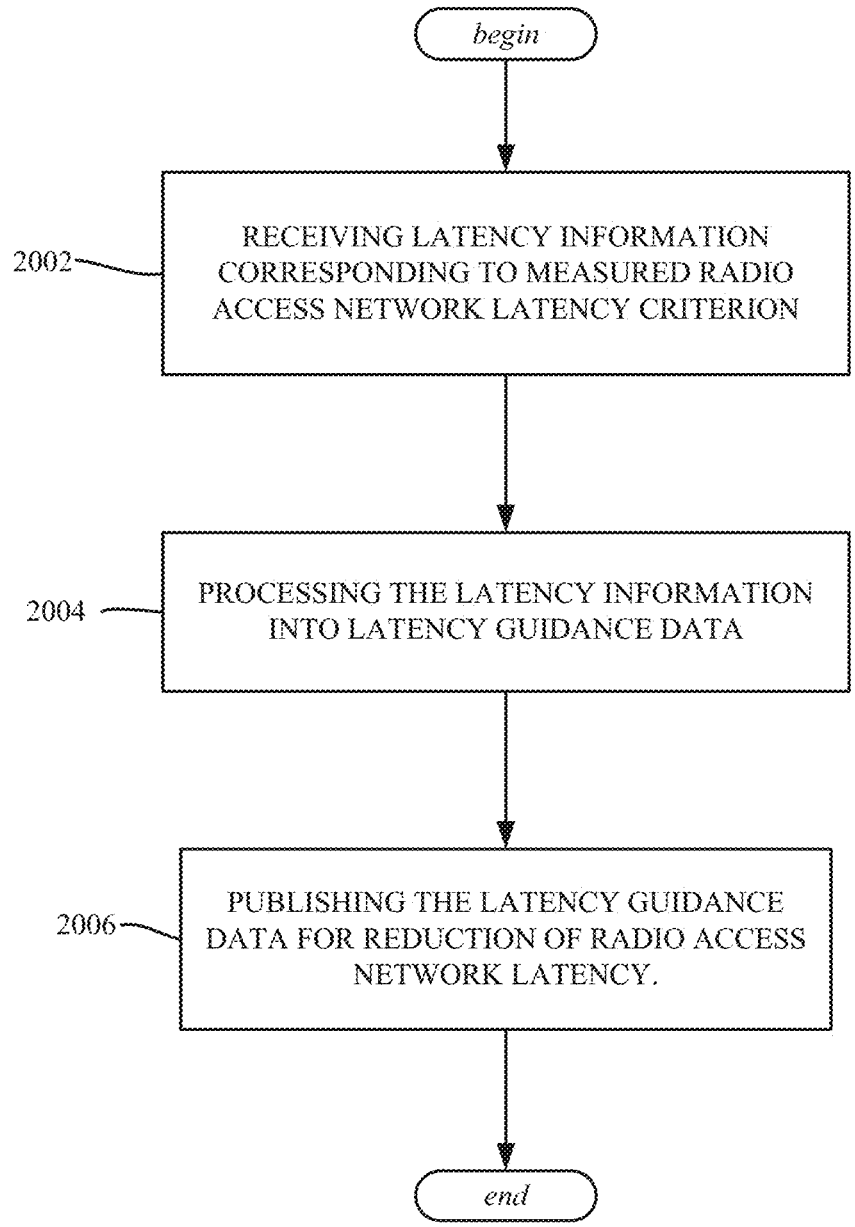
FIG. 20 illustrates a flow diagram directed towards example operations for obtaining and publishing latency guidance information for reducing RAN latency, in accordance with various aspects and implementations of the subject disclosure.

One or more aspects are represented in FIG. 20 as example operations, such as corresponding to a machine-readable storage medium, comprising executable instructions that, when executed by a processor, facilitate performance of the operations. Operation 2002 represents receiving latency information corresponding to measured radio access network latency criterion. Operation 2004 represents processing the latency information into latency guidance data. Operation 2006 represents publishing the latency guidance data for reduction of radio access network latency.

Processing the latency information into the latency guidance data can comprise inputting the latency guidance data into a learned prediction model and receiving the latency guidance data as output from the learned prediction model.

Publishing the latency guidance data for the reduction of the radio access network latency can comprise facilitating latency reduction by recommending at least one of: a change in load-balancing, a handoff of a user equipment from a first network device to a second network device, edge caching, edge computation offloading, or a change in data scheduling. Publishing the latency guidance data for the reduction of the radio access network latency can comprise publishing the latency guidance data to at least one of: a radio access network controller, an edge network device, a base station device, a content provider, or a user equipment.

As can be seen, described herein is the suitability of widely-deployed LTE networks to support low-latency applications. By measuring RAN latency via experiments and using real-world production networks, and further correlating with higher-layer latencies, the technology described herein provides a way for LTE networks to satisfy the QoE demands of low-latency applications. The estimation and prediction models built for RAN latency provide an online latency guidance platform that uses these models for network and application optimization. By equipping an LTE network with guidance analytics and intelligence, it is feasible to accommodate low-latency applications like VR.

Figure 21:
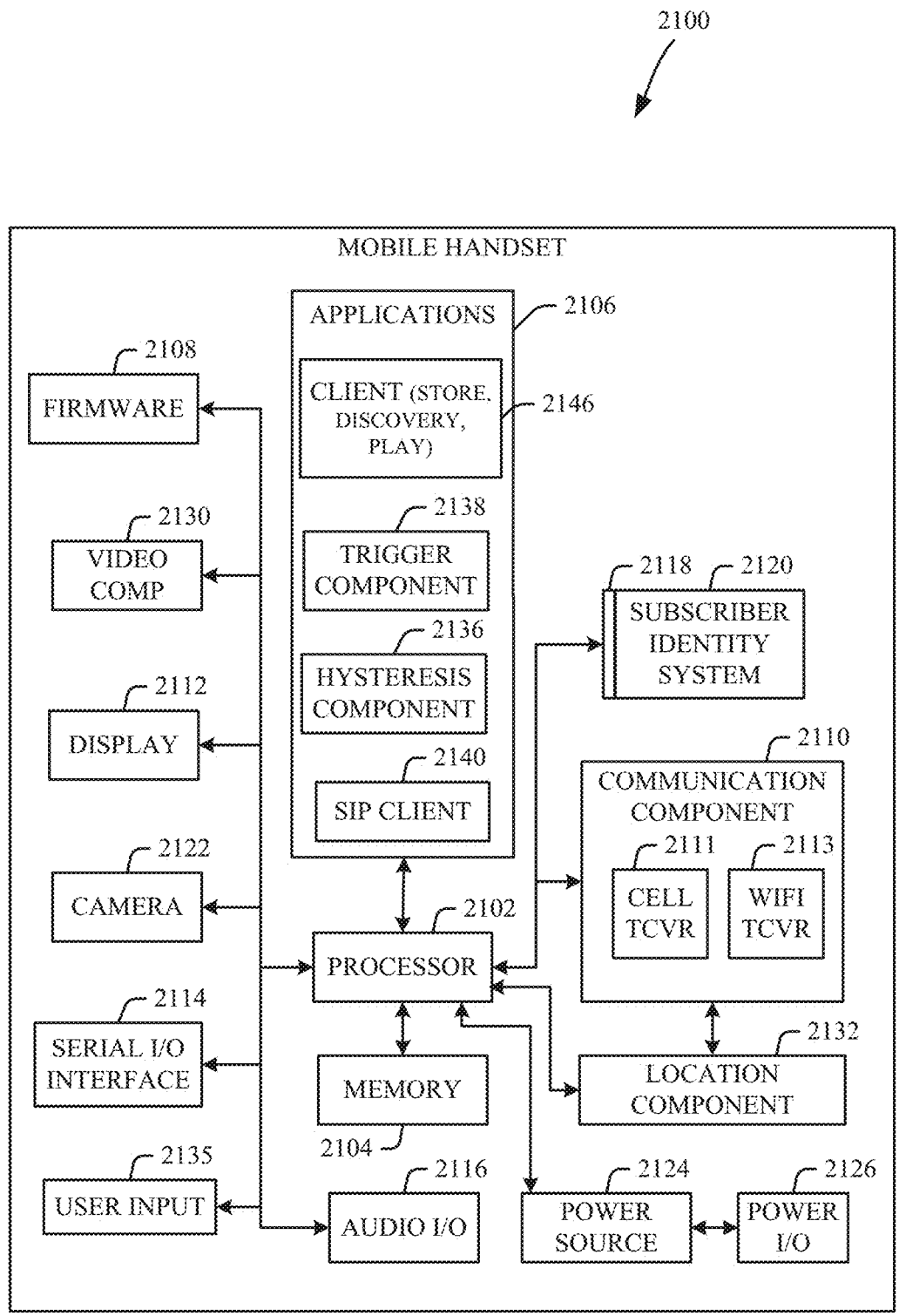
FIG. 21 illustrates an example block diagram of an example mobile handset operable to engage in a system architecture that facilitates wireless communications according to one or more embodiments described herein.

Referring now to FIG. 21, illustrated is an example block diagram of an example mobile handset 2100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 2102 for controlling and processing all onboard operations and functions. A memory 2104 interfaces to the processor 2102 for storage of data and one or more applications 2106 (e.g., a video player software, user feedback component software, etc.). Other applications can include voice recognition of predetermined voice commands that facilitate initiation of the user feedback signals. The applications 2106 can be stored in the memory 2104 and/or in a firmware 2108, and executed by the processor 2102 from either or both the memory 2104 or/and the firmware 2108. The firmware 2108 can also store startup code for execution in initializing the handset 2100. A communications component 2110 interfaces to the processor 2102 to facilitate wired/wireless communication with external systems, e.g., cellular networks, VoIP networks, and so on. Here, the communications component 2110 can also include a suitable cellular transceiver 2111 (e.g., a GSM transceiver) and/or an unlicensed transceiver 2113 (e.g., Wi-Fi, WiMax) for corresponding signal communications. The handset 2100 can be a device such as a cellular telephone, a PDA with mobile communications capabilities, and messaging-centric devices. The communications component 2110 also facilitates communications reception from terrestrial radio networks (e.g., broadcast), digital satellite radio networks, and Internet-based radio services networks The handset 2100 includes a display 2112 for displaying text, images, video, telephony functions (e.g., a Caller ID function), setup functions, and for user input. For example, the display 2112 can also be referred to as a "screen" that can accommodate the presentation of multimedia content (e.g., music metadata, messages, wallpaper, graphics, etc.). The display 2112 can also display videos and can facilitate the generation, editing and sharing of video quotes. A serial I/O interface 2114 is provided in communication with the processor 2102 to facilitate wired and/or wireless serial communications (e.g., USB, and/or IEEE 2194) through a hard-wire connection, and other serial input devices (e.g., a keyboard, keypad, and mouse). This supports updating and troubleshooting the handset 2100, for example. Audio capabilities are provided with an audio I/O component 2116, which can include a speaker for the output of audio signals related to, for example, indication that the user pressed the proper key or key combination to initiate the user feedback signal. The audio I/O component 2116 also facilitates the input of audio signals through a microphone to record data and/or telephony voice data, and for inputting voice signals for telephone conversations.

The handset 2100 can include a slot interface 2118 for accommodating a SIC (Subscriber Identity Component) in the form factor of a card Subscriber Identity Module (SIM) or universal SIM 2120, and interfacing the SIM card 2120 with the processor 2102. However, it is to be appreciated that the SIM card 2120 can be manufactured into the handset 2100, and updated by downloading data and software.

The handset 2100 can process IP data traffic through the communications component 2110 to accommodate IP traffic from an IP network such as, for example, the Internet, a corporate intranet, a home network, a person area network, etc., through an ISP or broadband cable provider. Thus, VoIP traffic can be utilized by the handset 2100 and IP-based multimedia content can be received in either an encoded or a decoded format.

A video processing component 2122 (e.g., a camera) can be provided for decoding encoded multimedia content. The video processing component 2122 can aid in facilitating the generation, editing, and sharing of video quotes. The handset 2100 also includes a power source 2124 in the form of batteries and/or an AC power subsystem, which power source 2124 can interface to an external power system or charging equipment (not shown) by a power 110 component 2126.

The handset 2100 can also include a video component 2130 for processing video content received and, for recording and transmitting video content. For example, the video component 2130 can facilitate the generation, editing and sharing of video quotes. A location tracking component 2132 facilitates geographically locating the handset 2100. As described hereinabove, this can occur when the user initiates the feedback signal automatically or manually. A user input component 2134 facilitates the user initiating the quality feedback signal. The user input component 2134 can also facilitate the generation, editing and sharing of video quotes. The user input component 2134 can include such conventional input device technologies such as a keypad, keyboard, mouse, stylus pen, and/or touch screen, for example.

Referring again to the applications 2106, a hysteresis component 2136 facilitates the analysis and processing of hysteresis data, which is utilized to determine when to associate with the access point. A software trigger component 2138 can be provided that facilitates triggering of the hysteresis component 2136 when the Wi-Fi transceiver 2113 detects the beacon of the access point. A SIP client 2140 enables the handset 2100 to support SIP protocols and register the subscriber with the SIP registrar server. The applications 2106 can also include a client 2142 that provides at least the capability of discovery, play and store of multimedia content, for example, music.

The handset 2100, as indicated above related to the communications component 2110, includes an indoor network radio transceiver 2113 (e.g., Wi-Fi transceiver). This function supports the indoor radio link, such as IEEE 802.11, for the dual-mode GSM handset 2100. The handset 2100 can accommodate at least satellite radio services through a handset that can combine wireless voice and digital radio chipsets into a single handheld device.

Figure 22:
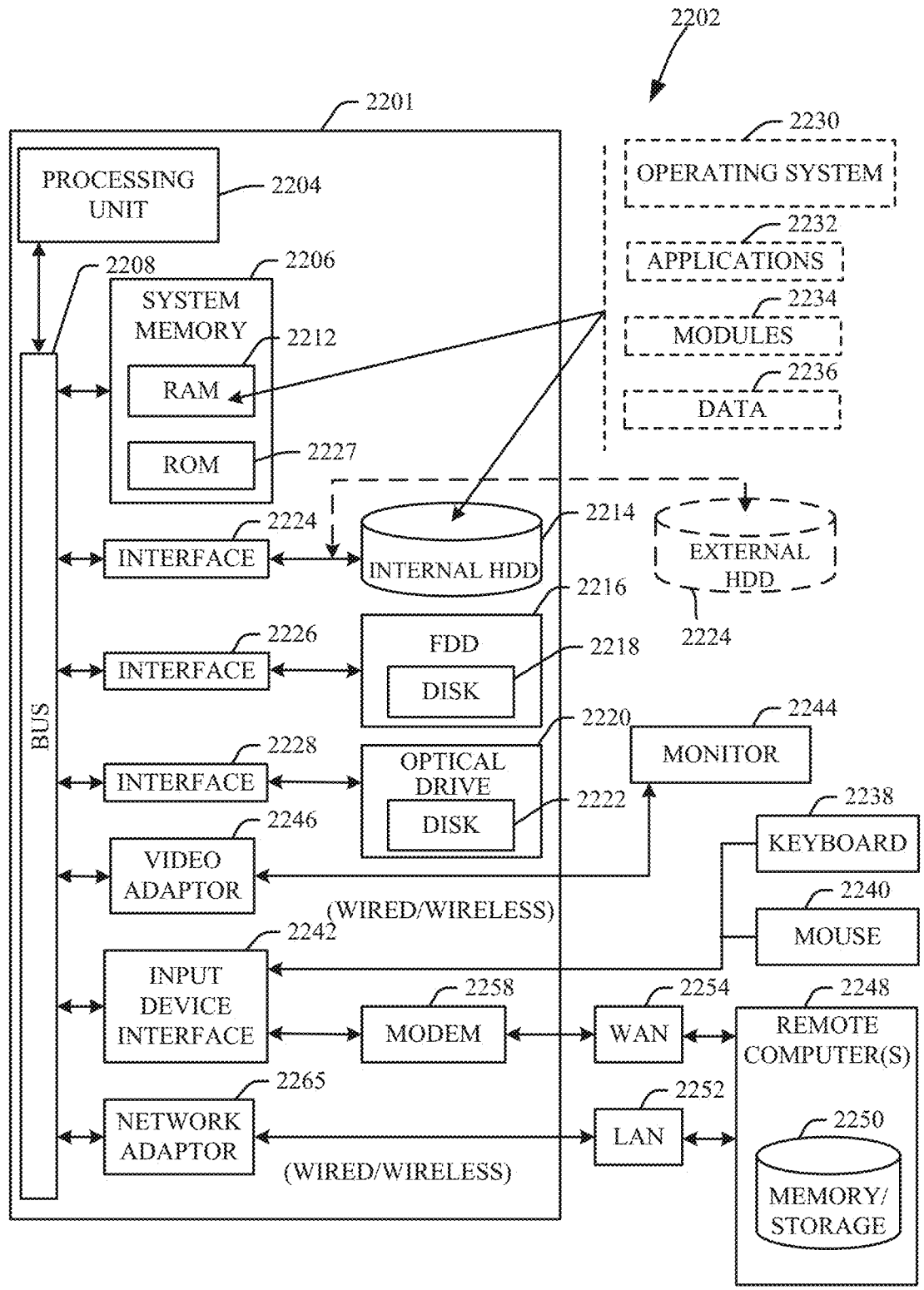
FIG. 22 illustrates an example block diagram of an example computer operable to engage in a system architecture that facilitates wireless communications according to one or more embodiments described herein.

Referring now to FIG. 22, illustrated is an example block diagram of an example computer 2200 operable to engage in a system architecture that facilitates wireless communications according to one or more embodiments described herein. The computer 2200 can provide networking and communication capabilities between a wired or wireless communication network and a server (e.g., Microsoft server) and/or communication device. In order to provide additional context for various aspects thereof, FIG. 22 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 22 is but one example of a computing device.

In order to provide a context for the various aspects of the disclosed subject matter, FIG. 22 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 2220 (see below), non-volatile memory 2222 (see below), disk storage 2224 (see below), and memory storage 2246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 22 illustrates a block diagram of a computing system 2200 operable to execute the disclosed systems and methods in accordance with an embodiment. Computer 2212, which can be, for example, part of the hardware of system 2220, includes a processing unit 2214, a system memory 2216, and a system bus 2218. System bus 2218 couples system components including, but not limited to, system memory 2216 to processing unit 2214. Processing unit 2214 can be any of various available processors. Dual microprocessors and other multiprocessor architectures also can be employed as processing unit 2214.

System bus 2218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 2216 can include volatile memory 2220 and nonvolatile memory 2222. A basic input/output system (BIOS), containing routines to transfer information between elements within computer 2212, such as during start-up, can be stored in nonvolatile memory 2222. By way of illustration, and not limitation, nonvolatile memory 2222 can include ROM, PROM, EPROM, EEPROM, or flash memory. Volatile memory 2220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2212 can also include removable/non-removable, volatile/non-volatile computer storage media. FIG. 22 illustrates, for example, disk storage 2224. Disk storage 2224 includes, but is not limited to, devices like a magnetic disk drive, floppy disk drive, tape drive, flash memory card, or memory stick. In addition, disk storage 2224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2224 to system bus 2218, a removable or non-removable interface is typically used, such as interface 2226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 22 describes software that acts as an intermediary between users and computer resources described in suitable operating environment 2200. Such software includes an operating system 2228. Operating system 2228, which can be stored on disk storage 2224, acts to control and allocate resources of computer system 2212. System applications 2230 take advantage of the management of resources by operating system 2228 through program modules 2232 and program data 2234 stored either in system memory 2216 or on disk storage 2224. It is to be noted that the disclosed subject matter can be implemented with various operating systems or combinations of operating systems.

A user can enter commands or information into computer 2212 through input device(s) 2236. As an example, a mobile device and/or portable device can include a user interface embodied in a touch sensitive display panel allowing a user to interact with computer 2212. Input devices 2236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 2214 through system bus 2218 by way of interface port(s) 2238. Interface port(s) 2238 include, for example, a serial port, a parallel port, a game port, a universal serial bus (USB), an infrared port, a Bluetooth port, an IP port, or a logical port associated with a wireless service, etc. Output device(s) 2240 and a move use some of the same type of ports as input device(s) 2236.

Thus, for example, a USB port can be used to provide input to computer 2212 and to output information from computer 2212 to an output device 2240. Output adapter 2242 is provided to illustrate that there are some output devices 2240 like monitors, speakers, and printers, among other output devices 2240, which use special adapters. Output adapters 2242 include, by way of illustration and not limitation, video and sound cards that provide means of connection between output device 2240 and system bus 2218. It should be noted that other devices and/or systems of devices provide both input and output capabilities such as remote computer(s) 2244.

Computer 2212 can operate in a networked environment using logical connections to one or more remote computers, such as remote computer(s) 2244. Remote computer(s) 2244 can be a personal computer, a server, a router, a network PC, cloud storage, cloud service, a workstation, a microprocessor based appliance, a peer device, or other common network node and the like, and typically includes many or all of the elements described relative to computer 2212.

For purposes of brevity, only a memory storage device 2246 is illustrated with remote computer(s) 2244. Remote computer(s) 2244 is logically connected to computer 2212 through a network interface 2248 and then physically connected by way of communication connection 2250. Network interface 2248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 2250 refer(s) to hardware/software employed to connect network interface 2248 to bus 2218. While communication connection 2250 is shown for illustrative clarity inside computer 2212, it can also be external to computer 2212. The hardware/software for connection to network interface 2248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising, determining, by network equipment comprising a processor based on radio access network latency data representative of network latency associated with a communication network in which the network equipment operates, predicted latency guidance data comprising a first impact score indicative of a first rate of change of a transmission control protocol round trip time associated with an application, used by a user equipment, relative to the network latency and a second impact score indicative of a second rate of change of a motion-to-photon latency associated with the application relative to the network latency; and based on the predicted latency guidance data, facilitating, by the network equipment, a reduction in a communication latency that is experienced by the user equipment.

2. The method of claim 1, wherein the network equipment is first network equipment, and further comprising:

obtaining, by the first network equipment from second network equipment communicatively coupled to the first network equipment, the radio access network latency data according to a measured latency impact criterion.

3. The method of claim 1, wherein the radio access network latency data comprises data of a type selected from a group of data types comprising spectrum utilization data representative of spectrum utilization by the network equipment, signal quality data representative of a signal quality experienced by the user equipment, cell load data representative of a load level of respective network cell devices in the communication network, and traffic rate data representative of traffic observed by the network equipment.

4. The method of claim 1, wherein determining the predicted latency guidance data comprises processing the radio access network latency data via a machine-learned model.

5. The method of claim 1, wherein facilitating the reduction in the communication latency comprises:
generating a load balancing recommendation based on the predicted latency guidance data; and
transmitting, from the network equipment to a radio access network controller of the communication network, the load balancing recommendation.

6. The method of claim 1, wherein facilitating the reduction in the communication latency comprises:
generating a handoff recommendation based on the predicted latency guidance data, wherein the handoff recommendation relates to a handoff of the user equipment from a first base station of the communication network to a second base station of the communication network; and
transmitting, from the network equipment to a radio access network controller of the communication network, the handoff recommendation.

7. The method of claim 1, wherein facilitating the reduction in the communication latency comprises:
generating a data scheduling recommendation based on the predicted latency guidance data, the data scheduling recommendation relating to a schedule for communication of data by a base station serving the user equipment; and
transmitting, from the network equipment to the base station serving the user equipment, the data scheduling recommendation.

8. The method of claim 1, wherein the network equipment is first network equipment, and wherein facilitating the reduction in the communication latency comprises transmitting, from the first network equipment to second network equipment associated with a content provider for the application, the predicted latency guidance data.

9. The method of claim 1, wherein facilitating the reduction in the communication latency comprises transmitting, from the network equipment to the user equipment, the predicted latency guidance data.

10. The method of claim 1, wherein facilitating the reduction in the communication latency comprises:
generating a network slicing recommendation based on the predicted latency guidance data; and
transmitting, from the network equipment to a radio access network controller of the communication network, the network slicing recommendation.

11. Network equipment, comprising:
a processor; and
a memory that stores executable instructions that, when executed by the processor, facilitate performance of operations, comprising:
applying network latency data representative of network latency in a communication network in which the network equipment operates to a prediction model, resulting in latency guidance data comprising a first impact score indicative of a first rate of change of a transmission control protocol round trip time for an application, associated with a user equipment, relative to the network latency and a second impact score indicative of a second rate of change of a motion-to-photon latency of the application relative to the network latency; and
using the latency guidance data to facilitate a reduction in communication latency experienced by the user equipment in the communication network.

12. The network equipment of claim 11, wherein the operations further comprise:
obtaining, from a network device communicatively coupled to the network equipment, the network latency data according to a measured latency impact criterion.

13. The network equipment of claim 11, wherein the network latency data comprises data of a type selected from a group of data types comprising spectrum utilization data representative of spectrum utilization by the network equipment, signal quality data representative of a signal quality experienced by the user equipment, cell load data representative of a load level of respective network cell devices in the communication network, and traffic rate data representative of traffic observed by the network equipment.

14. The network equipment of claim 11, wherein using the latency guidance data to facilitate the reduction in the communication latency comprises:
generating a load balancing recommendation based on the latency guidance data; and
transmitting the load balancing recommendation to a radio access network controller of the communication network.

15. The network equipment of claim 11, wherein using the latency guidance data to facilitate the reduction in the communication latency comprises:
generating a data scheduling recommendation based on the latency guidance data, the data scheduling recommendation relating to a schedule for communication of data by a base station serving the user equipment; and
transmitting the data scheduling recommendation to the base station.

16. A non-transitory machine-readable medium comprising executable instructions that, when executed by a processor, facilitate performance of operations, the operations comprising:
processing radio access network latency information representative of latency observed in a communication network, the processing resulting in latency guidance data comprising a first impact score representing a first rate of change of a transmission control protocol round trip time for an application, used by a user equipment in the communication network, relative to the latency observed in the communication network and a second impact score representing a second rate of change of a motion-to-photon latency for the application relative to the latency observed in the communication network; and
enabling, based on the latency guidance data, a reduction in communication latency experienced by the user equipment in connection with usage of the application.

17. The non-transitory machine-readable medium of claim 16, wherein the operations further comprise:
obtaining, from a message router device in the communication network, the radio access network latency information according to a measured latency impact criterion.

18. The non-transitory machine-readable medium of claim 16, wherein the radio access network latency information comprises information of a type selected from a group of types comprising spectrum utilization information representative of spectrum utilization by network equipment operating in the communication network, signal quality information representative of a signal quality experienced by the user equipment, cell load information representative of a load level of respective network cell devices in the communication network, and traffic rate information representative of traffic observed by the network equipment.

19. The non-transitory machine-readable medium of claim 16, wherein the operations further comprise:
   generating a handoff recommendation based on the latency guidance data, wherein the handoff recommendation relates to a handoff of the user equipment from a first base station of the communication network to a second base station of the communication network; and
   transmitting, to a radio access network controller of the communication network, the handoff recommendation.

20. The non-transitory machine-readable medium of claim 16, wherein the operations further comprise:
   generating a network slicing recommendation based on the latency guidance data; and
   transmitting, to a radio access network controller of the communication network, the network slicing recommendation.

* * * * *